US012353027B2

(12) United States Patent
Sato et al.

(10) Patent No.: US 12,353,027 B2
(45) Date of Patent: Jul. 8, 2025

(54) FIBER OPTIC ADAPTERS FOR USE WITH FIBER OPTIC CONNECTORS AND METHODS FOR COUPLING FIBER OPTIC CONNECTORS

(71) Applicant: CORNING RESEARCH & DEVELOPMENT CORPORATION, Corning, NY (US)

(72) Inventors: Hiroyuki Sato, Sagamihara (JP); Akihiko Yazaki, Hachiouji (JP)

(73) Assignee: Corning Research & Development Corporation, Corning, NY (US)

( * ) Notice: Subject to any disclaimer, the term of this patent is extended or adjusted under 35 U.S.C. 154(b) by 365 days.

(21) Appl. No.: 17/966,962

(22) Filed: Oct. 17, 2022

(65) Prior Publication Data

US 2023/0142093 A1 May 11, 2023

Related U.S. Application Data

(60) Provisional application No. 63/277,729, filed on Nov. 10, 2021.

(51) Int. Cl.
 *G02B 6/38* (2006.01)
(52) U.S. Cl.
 CPC ......... *G02B 6/3895* (2013.01); *G02B 6/3825* (2013.01); *G02B 6/3893* (2013.01)
(58) Field of Classification Search
 CPC .... G02B 6/3821; G02B 6/3825; G02B 6/389; G02B 6/3893; G02B 6/3895
 See application file for complete search history.

(56) References Cited

U.S. PATENT DOCUMENTS

| 9,618,715 B1* | 4/2017 | Yang .................... G02B 6/3825 |
| 10,725,246 B1* | 7/2020 | Liu ....................... G02B 6/3893 |
| 2014/0016901 A1* | 1/2014 | Lambourn ........... G02B 6/3825 385/75 |
| 2023/0258874 A1* | 8/2023 | da Silva ................ G02B 6/387 385/138 |

FOREIGN PATENT DOCUMENTS

| JP | 2010-038988 A | 2/2010 |
| JP | 2012-083519 A | 4/2012 |
| JP | 2015-022222 A | 2/2015 |
| WO | WO-2024108294 A1 * | 5/2024 |

\* cited by examiner

*Primary Examiner* — Daniel Petkovsek
*Assistant Examiner* — Emma R. Oxford

(57) ABSTRACT

A fiber optic adapter for use with a fiber optic connector is provided. The fiber optic adapter indicates during installation of the connector when the connector is properly installed in the fiber optic adapter. The adapter includes a housing with a cavity at one end for receiving the fiber optic connector. The housing contains a sliding latch configured to contact the fiber optic connector when the fiber optic connector is inserted into the cavity. The sliding latch is movable within the housing from an extended position to a latched position. A connector latch in the housing is configured to engage the stop when the sliding latch is at the latched position. A spring is coupled to the sliding latch and is compressible during insertion of the fiber optic connector into the cavity. When the fiber optic connector is inserted into the cavity, the fiber optic adapter indicates when the sliding latch is not at the latched position.

22 Claims, 20 Drawing Sheets

FIBER OPTIC ADAPTERS FOR USE WITH FIBER OPTIC CONNECTORS AND METHODS FOR COUPLING FIBER OPTIC CONNECTORS

PRIORITY APPLICATION

This application claims the benefit of priority of U.S. Provisional Application No. 63/277,729, filed on Nov. 10, 2021, the content of which is relied upon and incorporated herein by reference in its entirety.

TECHNICAL FIELD

This disclosure relates generally to optical connectivity, and more particularly to adapters and methods for their use in coupling fiber optic connectors to fiber optic networks.

BACKGROUND

Optical fibers are useful in a wide variety of applications, including the telecommunications industry for voice, video, and data transmissions. Benefits of optical fibers include wide bandwidth and low noise operation. In a telecommunications system that uses optical fibers, there are typically many locations where fiber optic cables containing the optical fibers connect to equipment or other fiber optic cables. To provide these connections, fiber optic connectors are often provided at an end of the fiber optic cable to enable connection and disconnection of the fiber optic cables to a fiber optic adapter. The adapter allows fiber optic cables to be attached to other fiber optic cables singly or to a large network.

One negative consequence of using connectors at the ends of fiber optic cables occurs during installation of the fiber optic cables, particularly during connection of a fiber optic cable to a fiber optic adapter. This is generally shown in FIGS. 1-3. With reference now to FIG. 1, a typical optical connection in a fiber optic network between a pair of fiber optic cables 10, 12 is shown. The cables 10, 12 may be optically coupled together via fiber optic connectors 14, 16 that terminate their respective fiber optic cable 10, 12. The connectors 14, 16 each cooperate with a fiber optic adapter 18 which retains the connectors 14, 16 in a fixed relative orientation. Once assembled in the fiber optic adapter 18, an optical connection between the ends of the fiber optic cables 10, 12 is achieved. Although the connectors 14, 16 are shown to be identical and in the form of SC-type connectors (e.g., according to IEC 61754-20: 2012), the depicted features may be applicable to different connector designs, such as MU-type connectors, Ultra Physical Contact (UPC) connectors, Angled Physical Connect (APC) connectors.

During installation and with reference to FIG. 1, an installer inserts each connector 14 and 16 into the fiber optic adapter 18 as indicated by arrows 52. Following insertion, a proper, complete coupling of the connector 14 to the fiber optic adapter 18 is shown in FIG. 2. A complete coupling of the connector 14 to the fiber optic adapter 18 occurs when the connector 14 is fully seated within adapter 18. Once at that relative position, the connector 14 and the fiber optic adapter 18 are essentially locked together and may not be inadvertently separated. Optical transmission between the fiber optic cable 10 and the fiber optic cable 12 can occur. The connector 14 and the fiber optic adapter 18 may be separated or unlocked by intentional decoupling.

To that end, as shown in FIG. 2, the connector 14 includes a plug frame 20 with a shell 22 generally encasing the plug frame 20 and providing surfaces by which an installer (typically a technician) may grip the connector 14 during installation. Stops 24 extend outwardly from the plug frame 20 to engage the fiber optic adapter 18 during installation. The shell 22 is movable relative to the plug frame 20 and cooperates with the fiber optic adapter 18 during installation and during removal of the connector 14 from the adapter 18. A ferrule 26 (shown in FIGS. 1-3) is coupled to the fiber optic cable 10 and extends from the connector 14.

With continued reference to FIG. 2, the fiber optic adapter 18 includes a housing 30 (shown in phantom) which receives each of the connectors 14 and 16 from opposing directions as shown in FIG. 1. The housing 30 includes a sleeve holder 32 and an engagement portion 34 on each of the opposing sides of a central portion 36 that extends between the sleeve holder 32 and the engagement portion 34 and may extend outwardly relative to the surrounding housing 30 and provide a flange for mounting the fiber optic adapter 18 to another structure. The housing 30 defines at least one cavity on each side of the central portion 36 that cooperates with one of the connectors 14, 16. For example, a cavity 40 is defined between the sleeve holder 32 and the engagement portion 34. The sleeve holder 32 defines a receptacle 44 (shown in FIG. 3) that receives a split sleeve 46. The engagement portion 34 includes one or more wedge-shaped tabs 50 that project into the cavity 40 and that are configured to cooperate with the stops 24 on the plug frame 20 during insertion and resisting removal. The central portion 36 may be generally perpendicular to the insertion direction 52 and provide a limit to movement of the connectors 14 and 16 into the cavity 40 in the insertion direction 52.

During installation, and with reference to FIG. 3, the installer inserts the plug frame 20 of the connector 14 in one cavity 40 in the direction of arrow 52. The plug frame 20 slides into the cavity 40 and generally surrounds the sleeve holder 32. During insertion, the tabs 50 cooperate with the shell 22 and the plug frame 20 and are deflected in a direction outward relative to the plug frame 20 as they contact the stops 24, as shown. At the same time, the ferrule 26 is received in the receptacle 44 and engages the split sleeve 46.

When installation is complete (as is shown in FIG. 2), with the plug frame 20 fully seated in the cavity 40, the stops 24 are between the tabs 50 and the central portion 36. In this position, the connector 14 is locked in the fiber optic adapter 18. Movement of the plug frame 20 away from the fiber optic adapter 18 in the direction of arrow 54 in FIG. 2 causes the tab 50 to contact the stop 24. As shown in FIG. 2, this contact and the relative orientation of the surfaces of the tab 50 and stop 24 interferes with further movement in the direction of arrow 54. Once the tab 50 engages the stop 24, inadvertent movement of the plug frame 20 relative to the fiber optic adapter 18 in the direction of arrow 54 is prevented. This interference fit between the fiber optic adapter 18 and the connector 14 prevents unintentional removal of the connector 14 from the adapter 18. Although not shown in FIG. 2, a similar structural relationship may exist between the fiber optic adapter 18 and the connector 16 (shown in FIG. 1). When both connectors 14, 16 are fully seated into the fiber optic adapter 18, optical transmission is possible between the fiber optic cable 10 and the fiber optic cable 12 (FIG. 1) and unintentional separation of the connectors 14, 16 from the adapter 18 is prevented.

However, during installation, the installer sometimes fails to fully insert one or both connectors 14, 16 into a locked position in the fiber optic adapter 18. This is shown by way of example in FIG. 3. During installation, the ferrule 26 frictionally engages the split sleeve 46 and resists the installer's efforts to fully seat the connector 14 into the cavity 40. Due to this resistance, the installer may mistakenly believe that the connector 14 is fully inserted into the fiber optic adapter 18 and is in the locked position.

An example of a failure to fully insert the connector 14 into engagement with the fiber optic adapter 18 is shown in FIG. 3. In the position shown, the tabs 50 may contact the stops 24. In the exemplary position, the engagement portions 34 are deflected outward with the tabs 50 on the stops 24. Yet, the plug frame 20 is not in an installed position relative to the fiber optic adapter 18. Despite the incomplete installation, optical transmission through the fiber optic cables 10, 12 may occur. In that regard, the ferrule 26 may extend far enough into the split sleeve 46 so that optical transmission between the fiber optic cable 10 and the fiber optic cable 12 (FIG. 1) is possible. Thus, a signal check of the optical transmission quality between cables 10, 12 may not indicate the faulty installation. And, a visual inspection of the fiber optic adapter 18 would not reveal the slight outward deflection of the engagement portion 34 relative to the shell 22 since this portion of the fiber optic adapter 18 is hidden from view by the housing 30. While some connectors have a depth line to indicate full insertion into an adapter, the line on the connector can be difficult to discern and installers sometimes don't understand the purpose of the line or forget to visually check its location relative to the adapter upon completion of the installation. Thus, the incomplete assembly of the connector 14 and the fiber optic adapter 18 is not easily identified.

Despite the incomplete installation, optical transmission service through cables 10 and 12 may commence. Over time, however, the lack of a complete insertion and locking of the connector 14 in the fiber optic adapter 18 permits the connector 14 to separate from the adapter 18. For example, the connector 14 may gradually back out of the fiber optic adapter 18, causing the ferrule 26 to move away from a ferrule (not shown) of the corresponding fiber optic cable 12. The increase in the gap between ferrules degrades optical signal transmission quality between the fiber optic cables 10, 12. Ultimately, degradation may continue to a point of service interruption. When degradation reaches a certain level or when service is interrupted, a service call is required to have a technician identify and correct the cause for the loss in transmission. Identification of the exact problem may be difficult given the above. Thus, current fiber optic adapters suffer from possible incomplete installation and subsequent service interruption which costs time and money to identify and correct.

Thus, there is a need in the fiber optic industry for improved fiber optic adapters and methods for coupling fiber optic cables in fiber optic networks. More particularly, there is a need for fiber optic adapters and methods that reduce or eliminate incomplete coupling in fiber optic network connections.

SUMMARY

A fiber optic adapter for use with a fiber optic connector having a plug frame with a stop and a shell is provided. The fiber optic adapter indicates during installation of the connector when the connector is not properly installed in the fiber optic adapter. The fiber optic adapter includes a housing that has a cavity at one end for receiving the fiber optic connector. The housing contains a sliding latch that is configured to contact the fiber optic connector when the fiber optic connector is inserted into the cavity. The sliding latch is movable within the housing from an extended position to a latched position. There is also a connector latch in the housing that is configured to engage the stop when the sliding latch is at the latched position. One or more springs are operably coupled to the sliding latch. At least one spring of the one or more springs is compressible during insertion of the fiber optic connector into the cavity. When the fiber optic connector is inserted into the cavity, the fiber optic adapter indicates when the sliding latch is not at the latched position. In an exemplary embodiment, the at least one compressible spring is capable of producing a total force that is sufficient to move the fiber optic connector in a direction out of the cavity when the sliding latch is not at the latched position. In an exemplary embodiment, the at least one spring is capable of moving the fiber optic connector in a direction out of the cavity when the sliding latch is moved by a distance less than a distance between the extended position and the latched position.

The housing may include a divider that defines a passageway adjacent the cavity and the sliding latch may include a housing engagement arm that is movable in the passageway. The divider may include a through-slot opening to the cavity and to the passageway, and the connector latch may include a protrusion positioned to extend through the through-slot when the fiber optic connector is inserted into the cavity. In this embodiment, the protrusion is configured to contact the housing engagement arm through the through-slot when the sliding latch moves toward the latched position. The protrusion deflects the housing engagement arm away from the divider as the sliding latch moves toward the latched position. The housing engagement arm may include a stop, and the divider may define a ledge that is engageable with the stop at the latched position. The sliding latch may form an interference fit with the housing at the latched position. The at least one compressible spring may be compressed when the sliding latch is at the latched position. The passageway may open at the end of the housing adjacent the cavity, and the housing engagement arm may be visible in the passageway when the sliding latch is at the extended position.

In an exemplary embodiment, the one or more springs includes at least one spring that is coupled to the sliding latch and is extendable when the fiber optic connector is inserted into the cavity. The at least one extendable spring is coupled to an indicator flag that projects from the housing when the sliding latch is not at the latched position. In one embodiment, the indicator flag has only two positions when the connector is inserted into the cavity, an extended position in which the visual indicator projects from the housing and a retracted position in which the visual indicator is within the housing.

In an exemplary embodiment, a fiber optic adapter for use with a fiber optic connector having a plug frame with a stop and a shell is provided. The fiber optic adapter includes a housing that has a cavity at one end for receiving the fiber optic connector. The housing contains a sliding latch that is movable in the housing and is configured to contact the fiber optic connector when the fiber optic connector is inserted into the cavity. The sliding latch includes a housing engagement arm and has an extended position and a latched position at which the fiber optic connector is coupled to the fiber optic adapter. A connector latch may be configured to engage the stop when the sliding latch is at the latched position. The connector latch has a protrusion that deflects the housing engagement arm outwardly as the sliding latch is moved toward the latched position. At least one spring is operably coupled to the sliding latch. The at least one spring is compressible during insertion of the fiber optic connector into the cavity and is capable of moving the fiber optic connector in a direction out of the cavity when the sliding latch is moved by a distance less than a distance between the extended position and the latched position. The housing engagement arm may form an interference fit with the housing at the latched position. In one embodiment, the housing includes a divider defining a passageway, and the housing engagement arm is movable in the passageway. The divider may include a through-slot, and the protrusion may extend through the through-slot when the sliding latch is moved toward the latched position. The divider may include a ledge in the passageway, and the housing engagement arm may contact the ledge at the latched position. In one embodiment, the at least one spring is compressed when the sliding latch is in the latched position.

In an exemplary embodiment, a fiber optic adapter for use with a fiber optic connector having a plug frame with a stop and a shell is provided. The fiber optic adapter includes a housing that has a cavity at one end for receiving the fiber optic connector. The adapter includes a sliding latch that is configured to contact the fiber optic connector when the fiber optic connector is inserted into the cavity. The sliding latch is movable within the housing from an extended position to a latched position. A connector latch is configured to engage the stop when the sliding latch is at the latched position. One or more springs are operably coupled to the sliding latch. At least one spring of the one or more springs is compressible during insertion of the fiber optic connector into the cavity. An indicator flag movable in the housing has an extended position and a retracted position. There is at least one spring coupled to the sliding latch and the indicator flag. The at least one spring is extendable when the fiber optic connector is inserted into the cavity. When the sliding latch reaches the latched position, the indicator flag is moved from the extended position to the retracted position. The indicator flag may have only the extended position and the retracted position.

BRIEF DESCRIPTION OF THE DRAWINGS

The accompanying drawings are included to provide a further understanding and are incorporated in and constitute a part of this specification. The drawings illustrate one or more embodiment(s), and together with the description explain principles and operation of the various embodiments. Features and attributes associated with any of the embodiments shown or described may be applied to other embodiments shown, described, or appreciated based on this disclosure.

DETAILED DESCRIPTION

Figure 1:
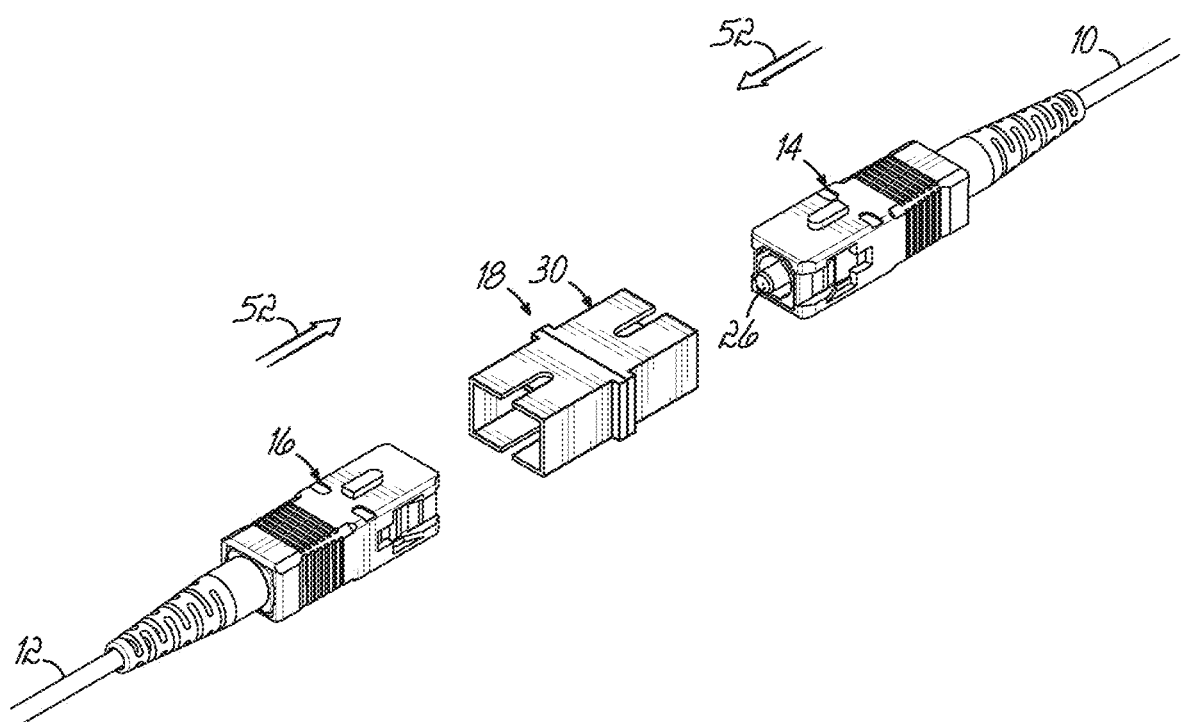
FIG. 1 is a perspective disassembled view of an end-to-end connection between two fiber optic connectors with a conventional fiber optic adapter.

With reference generally to the figures, a fiber optic adapter according to embodiments of the disclosure provides an indication when a connector, such as the connectors 14, 16 of FIG. 1, is incompletely (i.e., improperly) installed in the fiber optic adapter. The indication provided generally occurs immediately upon insertion or once the connector is inserted into the fiber optic adapter and released. That is, the fiber optic adapter spontaneously acts in the presence of the installer. An improperly installed connector is apparent to the installer during installation. Thus, by an action of the fiber optic adapter in response to an incomplete insertion of a connector, a subsequent service call due to improper installation of the connector is avoided.

With reference to an exemplary embodiment shown in FIGS. 4-11, a fiber optic adapter 100 may forcibly move a connector 14 (shown in FIGS. 1 and 7-11) from the adapter 100 if the connector 14 is improperly installed during installation. This is described with reference to FIGS. 7-9. In this exemplary embodiment, if the installer fails to insert the connector 14 far enough into the fiber optic adapter 100, once the installer releases the connector 14, the adapter 100 will spontaneously push the connector 14 backwards and in a direction out of the adapter 100. In essence, in one embodiment, if the installer fails to properly insert the connector 14, it pops back out. Stated another way, the fiber optic adapter 100 automatically uninstalls an incompletely inserted connector. This forcible movement of the connector 14 may be accompanied by an audible response, such as a click or snap, and so may further attract the installer's attention to an incomplete installation. Advantageously, if the forcible movement results in ejection of an improperly installed connector 14, this provides a visual (and likely audible) indication to the installer that the connector 14 was not properly seated. In that situation, the installer may reattempt to insert the connector 14 into the fiber optic adapter 100 with sufficient force to ensure that the connector 14 is inserted far enough to lock the connector 14 in the adapter 100.

Alternatively, if the connector is not fully ejected from the fiber optic adapter 100, forcible movement of the connector opposite the direction of installation may result in sufficient movement of the connector 14 to increase a gap between the fiber optic connections (e.g., between two ferrules terminating ends of fiber optic cables, such as the cables 10 and 12 shown in FIG. 1). The gap produced may be sufficient to interrupt signal transmission. While the connector may not be ejected, the connector will fail a transmission signal check following installation. Thus, the improper installation is timely identified.

Once the connector 14 is properly seated in the fiber optic adapter 100, optical transmission through the connection and sustained service is assured. While a simplex connector is shown and described, embodiments of the invention are not limited to use with simplex connectors. For example, it is contemplated that fiber optic adapters according to embodiments may be used with duplex and quad connectors. Further, while SC connectors are shown, embodiments are not limited to SC connectors, as MU connectors are contemplated.

Figure 4:
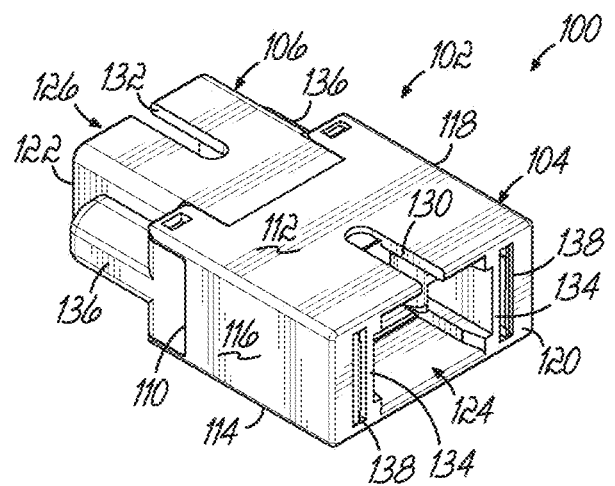
FIG. 4 is a perspective view of a fiber optic adapter according to one embodiment of the disclosure.
Figure 5:
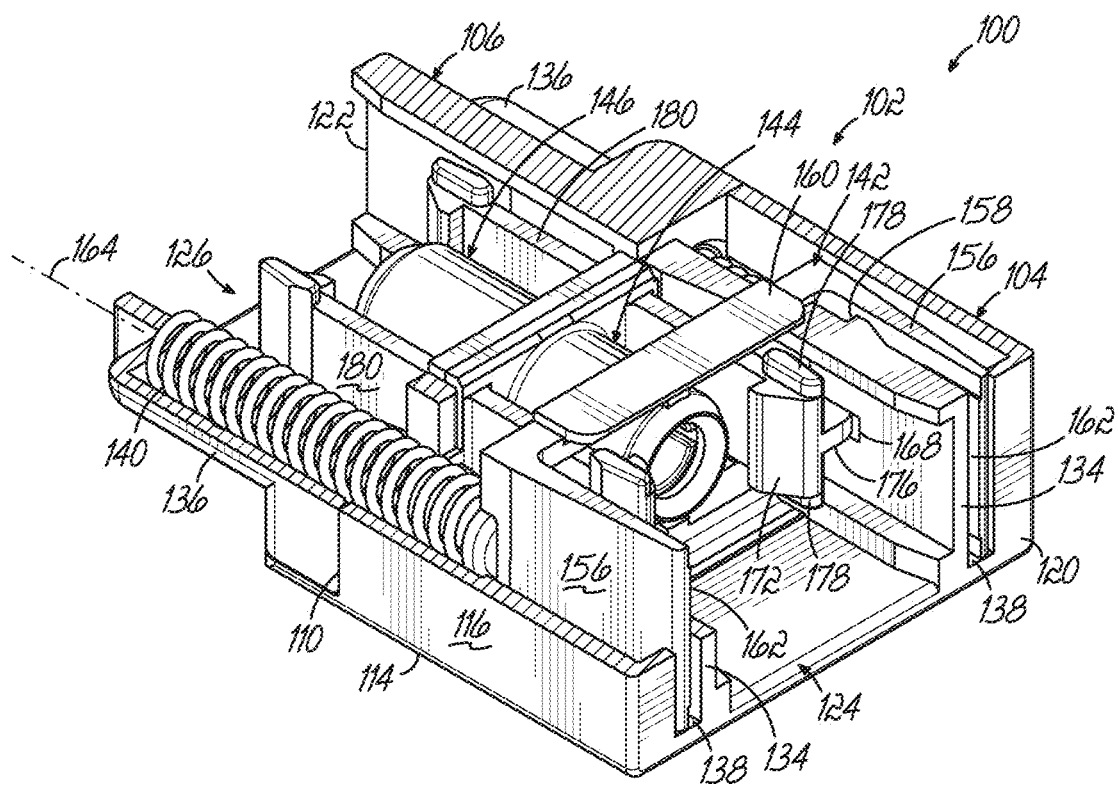
FIG. 5 is a partial cross-sectional perspective view of the embodiment of the fiber optic adapter shown in FIG. 4.

With reference to FIGS. 4 and 5, in one embodiment, the fiber optic adapter 100 includes a housing 102 having two portions 104, 106 which are joined together, for example, at a joint 110 (a snap fit construction is shown). The housing 102 is generally rectangular in shape with sides 112, 114, 116, and 118 and opposing ends 120 and 122. The ends 120 and 122 define cavities 124 and 126, respectively, for receiving a respective one of connectors 14, 16 (shown in FIG. 1). One of the sides, such as side 112, includes alignment slots 130, 132 that open to a respective cavity 124, 126 and receive a portion of the connector 14, 16. The slots 130, 132 ensure that the connector 14, 16 is inserted in a predetermined orientation.

One end, such as end 120, includes one or more dividers 134 that defines passageways 138 adjacent the cavity 124. In the exemplary embodiment shown, there is a pair of passageways 138 that are spaced apart by the cavity 124. Sides 116, 118 of the housing portion 106 may include silos 136 that generally project from the sides 116, 118 of the housing portion 106. The fiber optic adapter 100 includes opposing cavities 124 and 126 which receive connectors 14, 16 and may be a female-to-female type adapter to receive a connector 14, 16 at each end 120 and 122. Although not shown, the end 122 may be provided with a male connector. With the male connector at end 122 and the cavity 124 at the opposing end 120, the fiber optic adapter 100 may be a male-to-female type adapter.

Figure 6:
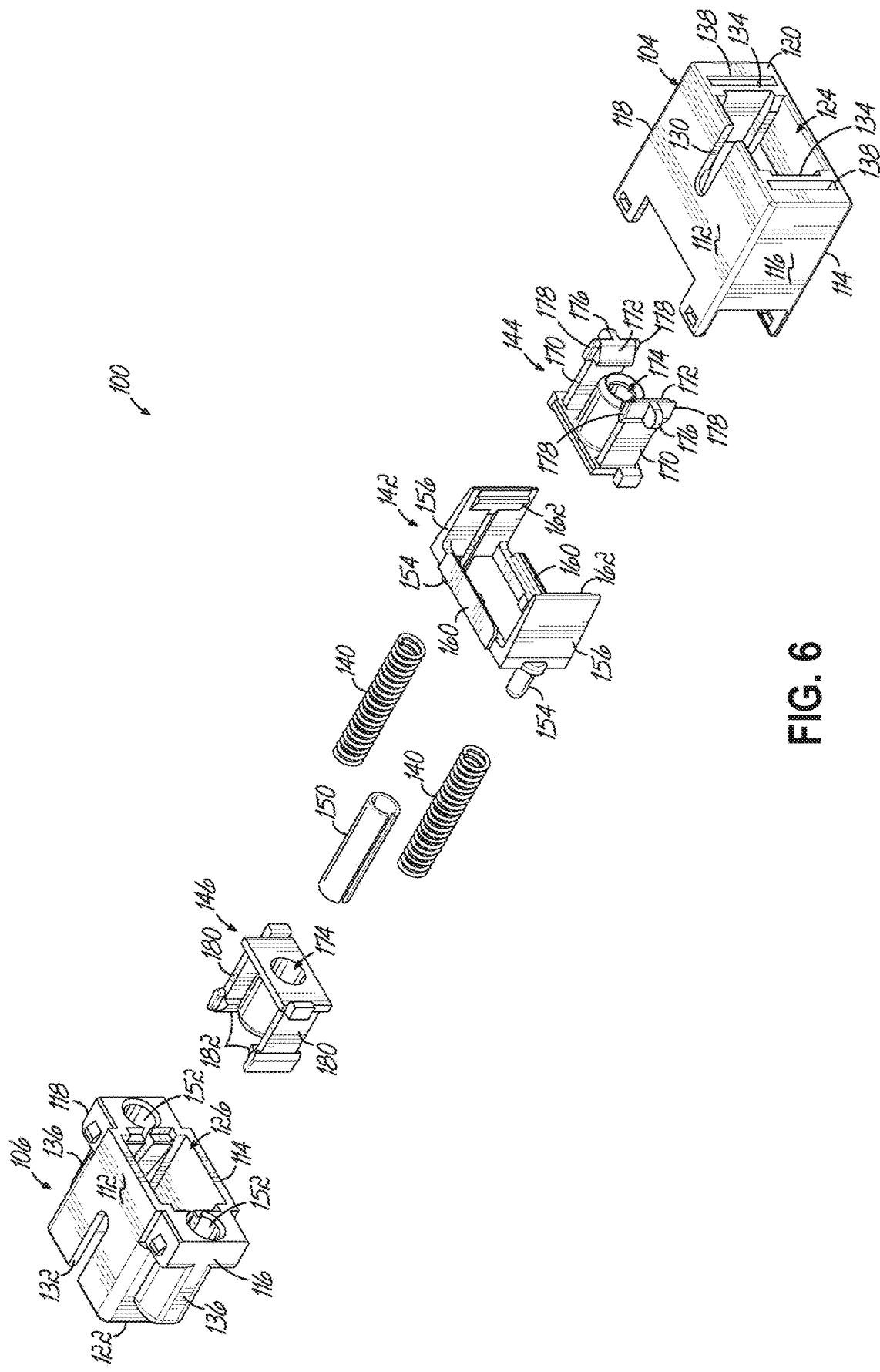
FIG. 6 is a disassembled perspective view of the fiber optic adapter shown in FIG. 4.

With reference now to FIGS. 5 and 6, in the exemplary embodiment shown, the housing 102 contains one or more springs 140 that in cooperation with a sliding latch 142 provide a force sufficient to move a connector outwardly from within the cavity 124 if the connector is not fully inserted to a locked position in the fiber optic adapter 100. In the embodiment shown, two springs 140 are engaged with the sliding latch 142 and are spaced apart at the sides 116, 118 of the housing 102. Embodiments of the invention are not limited to two springs 140. That is, it is within the scope of the present disclosure that alternate number of springs 140 may be used. The spring force may be sufficient to eject a connector from the cavity 124 or at a minimum be sufficient to move a connector in an outward direction from the cavity 124 by a distance sufficient to degrade or prevent optical transmission in fiber optic cable 10. In either condition, an installer may either visually identify the improper installation or identify the poor optical transmission during a transmission quality check following installation.

Figure 7:
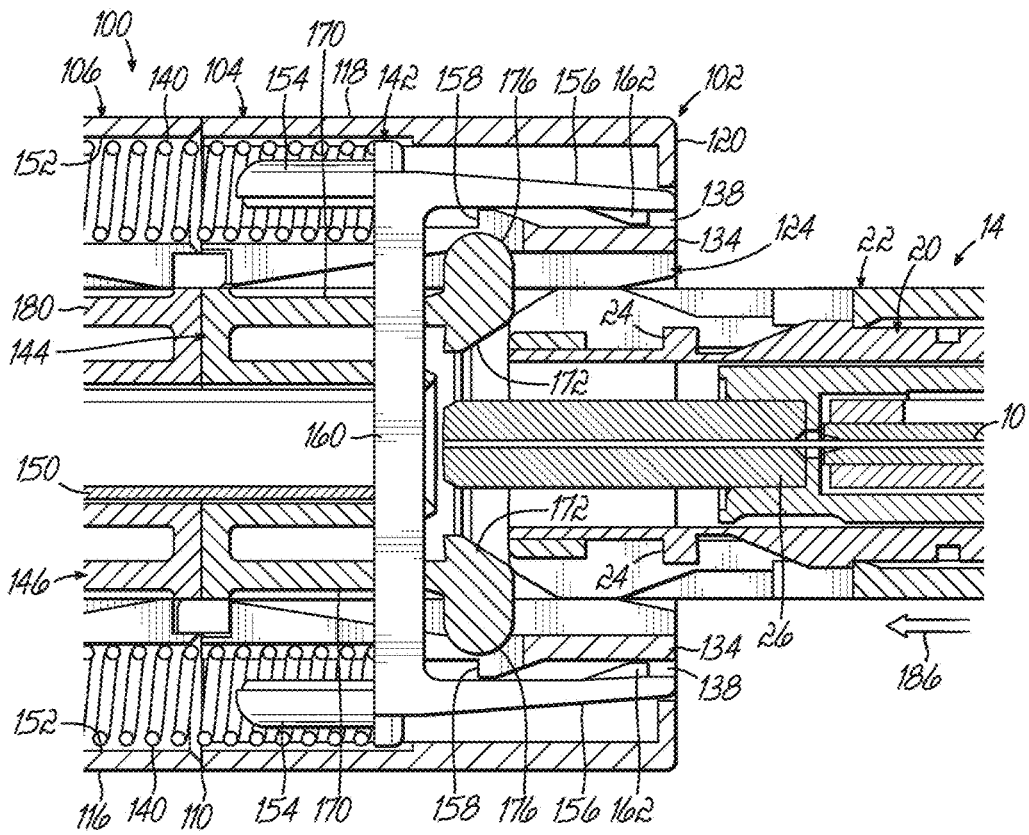
FIGS. 7-9 are schematic sectional views of the fiber optic adapter of FIG. 4 illustrating a sequence of inserting a connector into the fiber optic adapter during installation.
Figure 8:
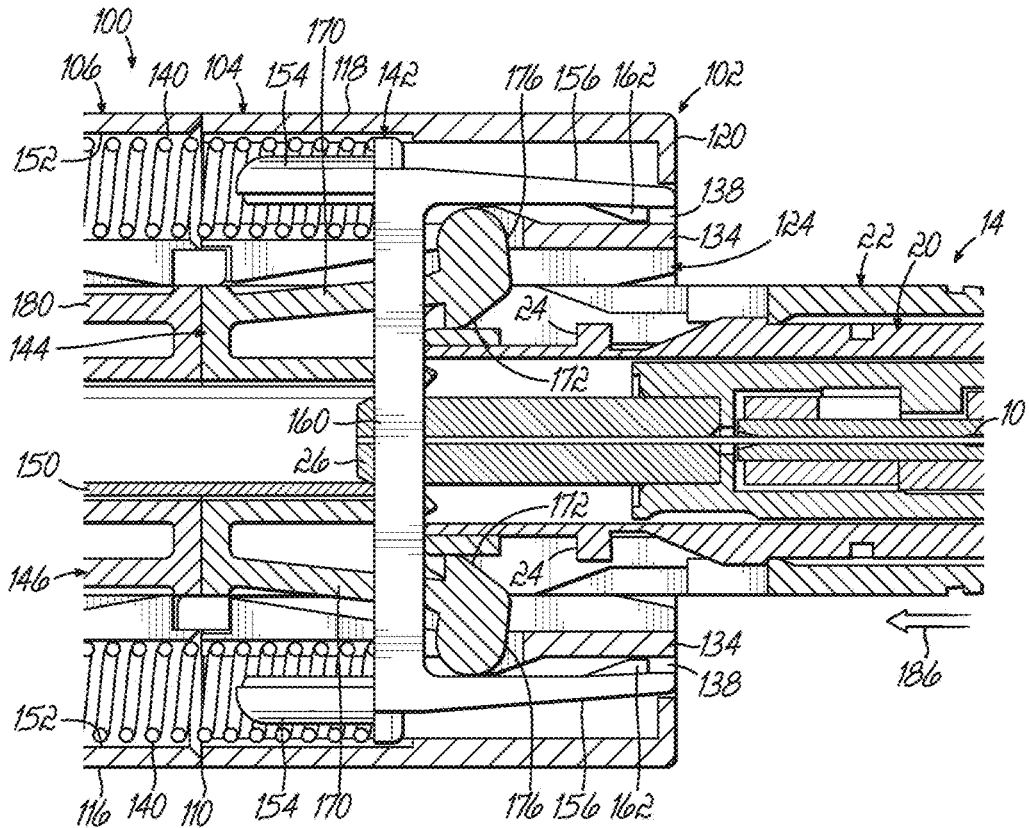
Figure 9:
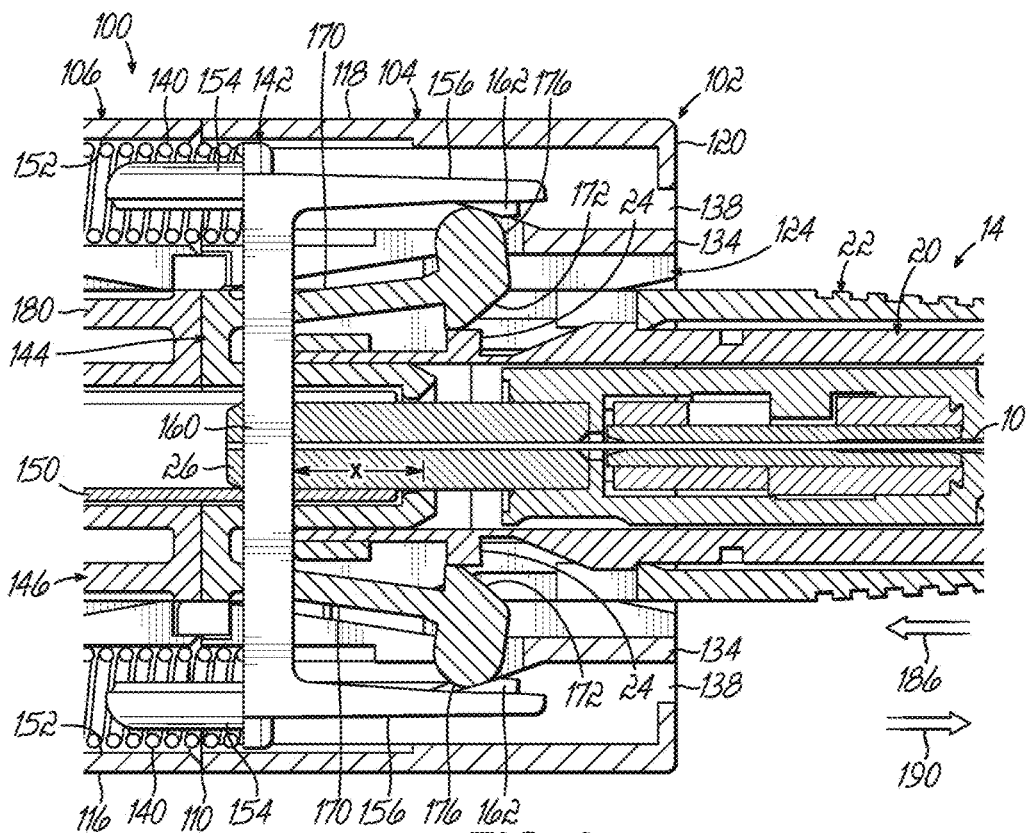

In addition to the springs 140 and sliding latch 142, the housing 102 contains a connector latch 144 abutting a sleeve holder 146. The connector latch 144 may be coupled to the sleeve holder 146. The connector latch 144 and sleeve holder 146 collectively house a sleeve 150 in receptable 174. The connector latch 144 and the sleeve holder 146 are configured to couple connectors (e.g., connectors 14 and 16 of FIG. 1) within cavities 124 and 126, respectively. By way of example, FIGS. 7-9 illustrate a connector 14 inserted into cavity 124, as described below.

In one embodiment, the silos 136 of the housing portion 106 define cavities 152 that receive the springs 140 and provide a surface against which the springs 140 may be compressed during insertion of a connector. The sliding latch 142 includes nipples 154 in silos 136 and that receive an opposing end of springs 140. The springs 140 are therefore compressible between the sliding latch 142 and the housing portion 106 during use of the fiber optic adapter 100 with the cavities 152 and nipples 154 defining a compression axis 164 for each spring 140. This is shown in FIG. 5, which depicts the fiber optic adapter 100 with springs 140 in a position to be compressed. The sliding latch 142 and springs 140 are movable in the housing 102 relative to the connector latch 144, as is schematically shown in FIGS. 7-9, described below.

The sliding latch 142 further includes a pair of housing engagement arms 156 that extend in an opposite direction from the nipples 154 and cooperate with the housing portion 104 when a connector is fully inserted into the cavity 124. A pair of cross beams 160 extend between the engagement arms 156 so that the beams 160 and arms 156 collectively with define a rectangular opening in the sliding latch 142. The rectangular opening receives the connector latch 144. A connector inserted into cavity 124 may contact the cross beams 160. Each of the housing engagement arms 156 includes a stop 162 (shown in FIGS. 7-10) extending inwardly to engage the housing portion 104 at ledges 158 (shown in FIG. 5) during insertion of a connector. In the exemplary embodiment, the ledges 158 are formed on the dividers 134 in the passageway 138. The dividers 134 also include a through-slot 168 that receives a portion of the connector latch 144. The through-slot 168 may be proximate each ledge 158 and provide an opening between the cavity 124 and the passageway 138. As shown in FIG. 5, tips of the arms 156 may be observable through passageways 138 on the end 120 of the fiber optic adapter 100. In embodiments where the passageways 138 do not open at the end 120, the arms 156 are not visible from end 120.

With continued reference to FIGS. 5 and 6, in the exemplary embodiment, the connector latch 144 is contained in the housing portion 104 proximate the cavity 124 and is configured to latch a connector in the cavity 124 to the housing 102. In that regard, the connector latch 144 includes a pair of engagement arms 170 having wedge-shaped tabs 172. Wedge-shaped tabs 172 face inwardly in the cavity 124 to engage a connector inserted into cavity 124. The engagement arms 170 also include a protrusion 176 extending outwardly from each arm 156 opposite the wedge-shaped tabs 172. As shown in FIG. 5, the protrusions 176 are positioned in the through-slot 168 in the dividers 134. While shown in the through-slot 168, the protrusions 176 may be proximate the through-slot 168. In either orientation (i.e., positioned in or proximate), the protrusions 176 are movable through the through-slot 168 to engage the housing engagement arms 156 of the sliding latch 142 during insertion of a connector into cavity 124, as is described below. In addition, an ear 178 extends laterally outward (e.g., toward the sides 112 and 114 of the housing portion 104 or perpendicularly to the protrusion 176) from the arm 170 between the protrusion 176 and the tabs 172 and is configured to contact a shell of a connector.

As mentioned previously, the sleeve holder 146 is received in the housing portion 106 and abuts the connector latch 144. The sleeve holder 146 is configured to couple a connector that is inserted into the cavity 126. In that regard, the sleeve holder 146 includes engagement arms 180 having wedge-shaped stops 182 much like engagement arms 170 and wedge-shaped tabs 172 of the connector latch 144. The sleeve holder 146 and the connector latch 144 define the receptacle 174 that receive the sleeve 150.

With reference to FIGS. 7-9, insertion of a connector 14 into the fiber optic adapter 100 is shown. In FIG. 7, an installer inserts the connector 14 according to arrow 186 into the cavity 124 on the end 120 of the fiber optic adapter 100. This may occur before or after insertion of a connector into the cavity 126. In the cavity 124, the connector 14 contacts the connector latch 144 at the engagement arms 170. Although not shown, initial contact of the shell 22 is at the ears 178. This contact begins separation of the engagement arms 170. With the connector 14 in this position, the springs 140 are at their maximum extension with the sliding latch 142 is at its fully extended, unlatched position with arms 156 at the end 120 of the housing 104. Although not shown, while the springs 140 are at their maximum extension, the springs 140 may be initially compressed though that compression may be minimal. The housing engagement arms 156 may be visible in the passageways 138 when the sliding latch 142 is in its fully extended, unlatched position.

With reference to FIG. 8, when the installer pushes the connector 14 further into the cavity 124 (according to arrow 186), the engagement arms 170 of the connector latch 144 are deflected outwardly toward the sides 116, 118 of the housing 102. In that regard, the forcible insertion of the connector 14 pushes the shell 22 against the ears 178 thereby pushing the tabs 172 apart. As the wedge-shaped tabs 172 are deflected outwardly toward the sides 116, 118, the protrusions 176 of the engagement arms 170 extend further through the through-slot 168 in the divider 134 and protrude into passageways 138. In the position shown in FIG. 8, the connector 14 may initially contact the cross beams 160 of the sliding latch 142 though the springs 140 may not be appreciably compressed by that contact.

Because the ferrule 26 may protrude slightly beyond the plug frame 20, the ferrule 26 may extend slightly into a recess formed by the sleeve 150.

With reference to FIG. 9, further forcible insertion of the connector 14 into the cavity 124 pushes on the sliding latch 142 and compresses the springs 140. As the installer pushes the connector 14 further into the cavity 124, the plug frame 20 and/or shell 22 contacts the cross beam 160 of the sliding latch 142. Movement of the sliding latch 142 according to arrow 186 compresses the springs 140 along axis 164 and brings the housing engagement arms 156 into contact with the protrusions 176. The protrusions 176 may deflect the housing engagement arms 156 outwardly and away from contact with the divider 134. In the exemplary embodiment, at the same time as the housing engagement arms 156 contact the protrusions 176, the wedge-shaped tabs 172 of the connector latch 144 contact and begin to ride over the stops 24 of the plug frame 20.

At the position shown in FIG. 9, while the connector 14 is inserted into the fiber optic adapter 100, the connector 14 is not yet locked or latched to the fiber optic adapter 100. If the technician releases the connector 14 at this location, the springs 140 will push the connector 14 via the sliding latch 142 in the direction of arrow 190 (i.e., opposite of the insertion direction 186). The compressed springs 140 apply a force in a direction opposite to that of insertion. Thus, in the absence of the installer holding onto the connector 14, the compressed springs 140 will spontaneously push the connector 14 in the direction opposite to that of insertion. As set forth above, a force of the springs 140 produced by displacement x (labeled in FIG. 9) from the initial position of the sliding latch 142 to the position of the sliding latch 142 just before a latched/locked position is achieved (shown in FIG. 10) may be sufficient to push the connector 14 from the cavity 124. By way of example, a spring constant according to Hooke's law of one spring 140 according to embodiments of the invention may range from 0.5 N/mm to 1.8 N/mm.

Figure 2:
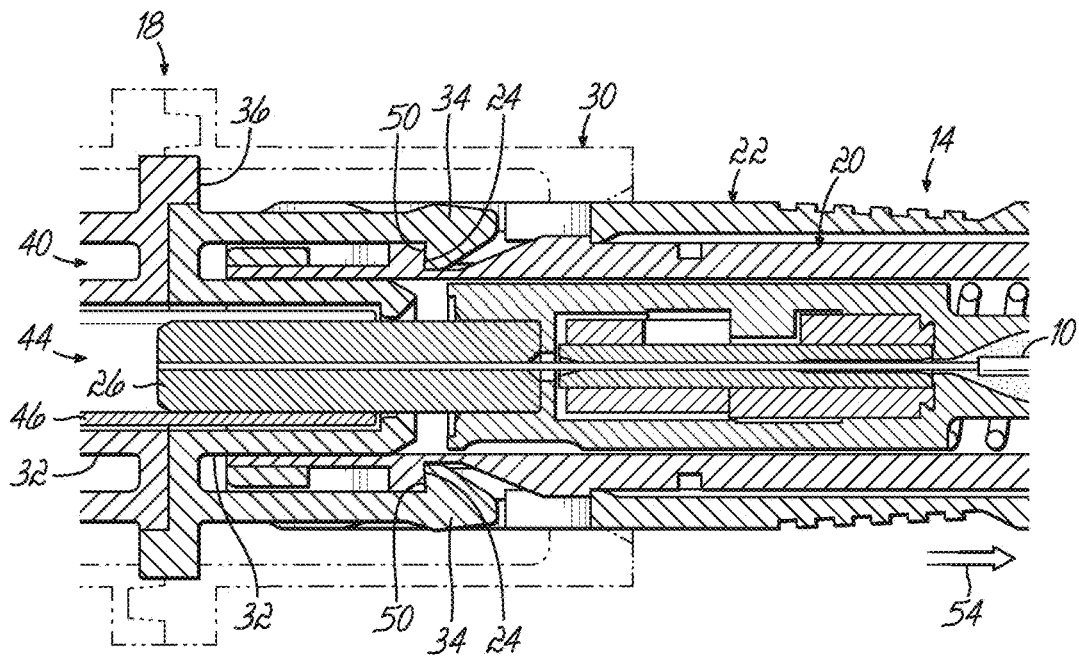
FIG. 2 is a cross-sectional view of a connector coupled to a conventional fiber optic adapter.
Figure 3:
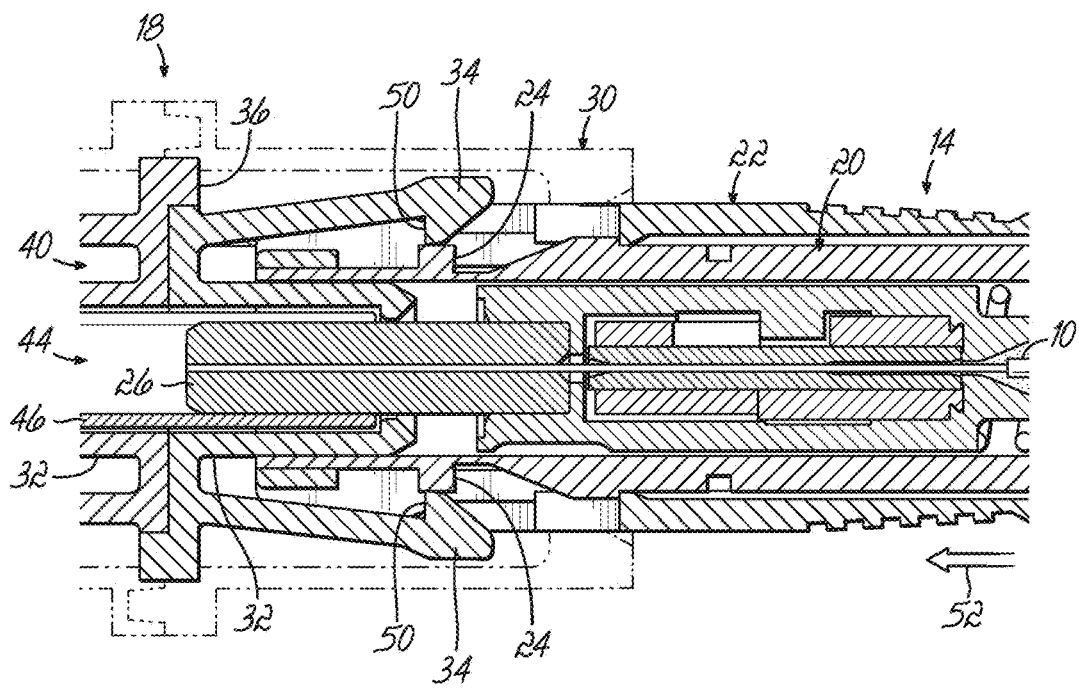
FIG. 3 is a cross-sectional view of a conventional fiber optic adapter and a connector partially inserted into the adapter.

If the springs 140 eject the connector 14 from the fiber optic adapter 100, this provides a visual indication (and likely an audible indication) that the connector 14 was not fully inserted and latched in the fiber optic adapter 100. Alternatively, movement of the connector 14 in the direction of arrow 192 is sufficient to cause optical transmission failure to/from the optical fiber 10. Thus, failure to fully insert the connector 14 to a latched/locked position results in an optical transmission signal failure that should be identified when the installer performs a signal quality check. As such, the incompletely inserted connector 14 is identified during installation and reduces or eliminates the need to dispatch a technician at a later time to investigate transmission degradation/failure due to incompletely installed connectors as is described above in FIGS. 1-3.

Figure 10:
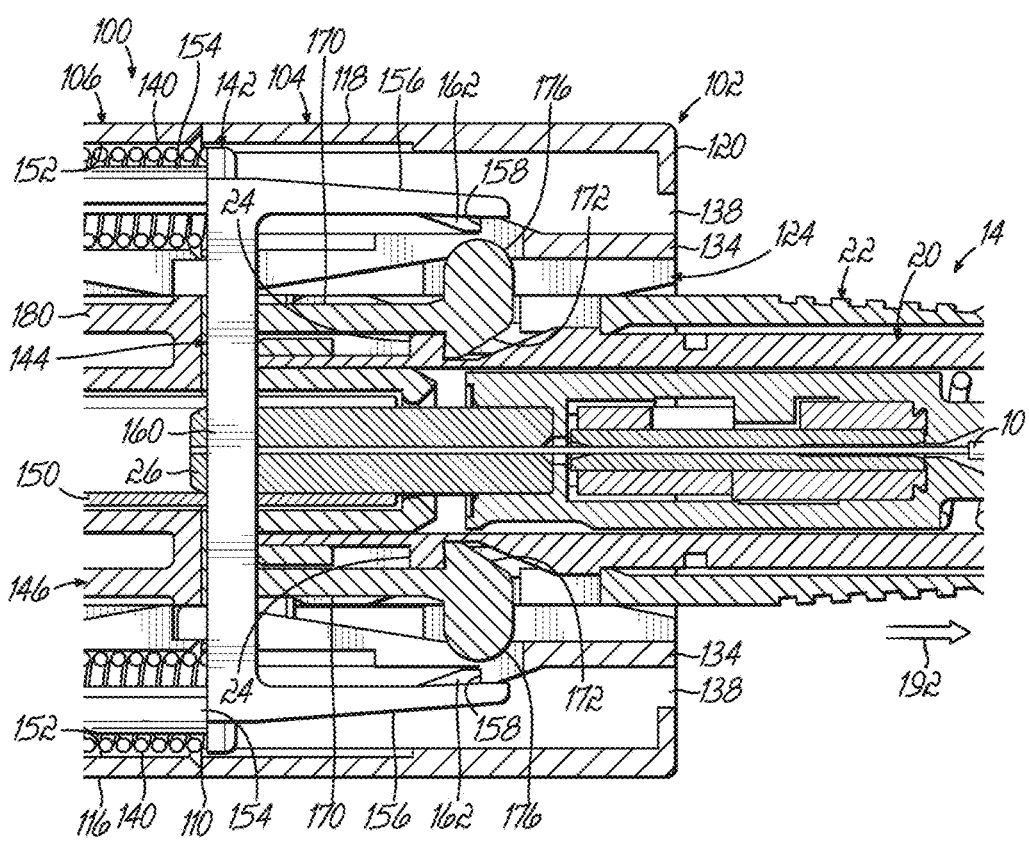
FIG. 10 is a schematic sectional view of the fiber optic adapter of FIG. 4 with a connector in an installed position.

With further insertion of the connector 14 into the fiber optic adapter 100 from the position shown in FIG. 9 to the position shown in FIG. 10, a latched position is reached. In the latched position, the connector 14 is locked to the fiber optic adapter 100. That is, the connector 14 and the adapter 100 resist their inadvertent separation. To that end, with further movement of the sliding latch 142 in the direction of arrow 186 (FIG. 9), the stops 24 of the plug frame 20 move past the wedge-shaped tabs 172. This permits the engagement arms 170 to spring back toward their undeflected positions. The wedge-shaped tabs 172 move to a position in which they form an interference fit to limit movement of the stop 24 on the plug frame 20 in a direction indicated by arrow 192. The stops 24 are then positioned between the wedge-shaped tabs 172 and the sleeve holder 146 and are effectively trapped in the fiber optic adapter 100. Thus, the connector 14 is latched to the fiber optic adapter 100 at this position. This configuration resists inadvertent, unintentional removal of the connector 14 from the fiber optic adapter 100.

Also, in the latched position, a substantial portion or all the force of the compressed springs 140 is carried by the housing 102 and is not transferred onto the connector latch 144 or connector 14. In the exemplary embodiment, once the engagement arms 170 are released and move toward their original, undeflected positions, the corresponding protrusions 176 disengage from contact with the housing engagement arms 156, and the housing engagement arms 156 move toward their original, undeflected positions (or inwardly toward the connector 14) to engage with the dividers 134. The stops 162 on the housing engagement arms 156 engage the ledges 158 on the divider 134 to form an interference fit. This interference fit resists movement of the sliding latch 142 from force applied by the compressed springs 140 in the direction of arrow 192. Once contact is made between the sliding latch 142 and the housing 102, the force from the compressed springs 140 is predominately carried by the housing 102 via the ledges 158 on the dividers 134 and not by the stops 24 and wedge-shaped tabs 172. Advantageously, the force from the compressed springs 140 is not carried appreciably by the connector 14 and the connector latch 144. This arrangement is believed to prolong the life of the connector 14 and/or prevent physical damage to the connector 14 over time.

Figure 11:
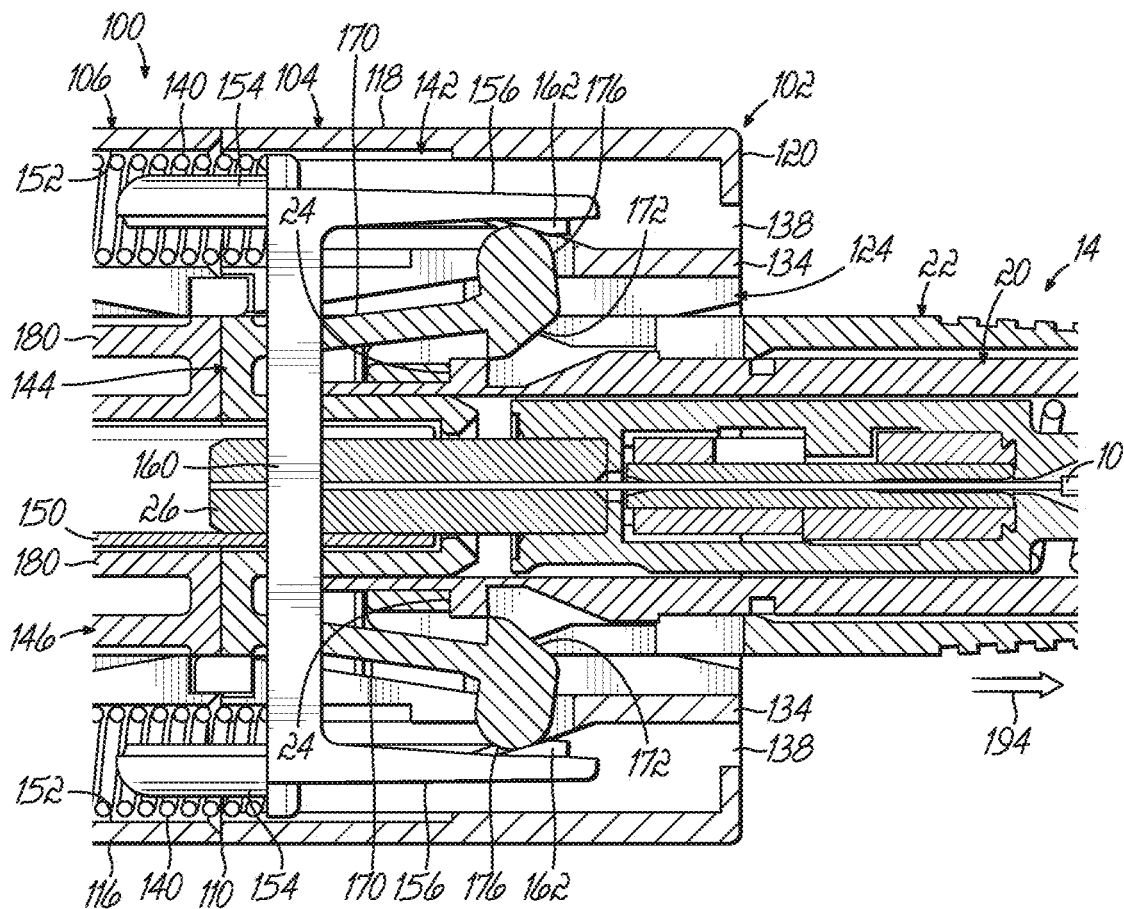
FIG. 11 is a schematic sectional view of the fiber optic adapter of FIG. 4 illustrating disassembly of a connector from the fiber optic adapter following installation.

With reference to FIG. 11, while the fiber optic adapter 100 resists unintentional, inadvertent removal of the connector 14 when it is in the latched position (shown in FIG. 10), a technician can remove the connector 14 from the fiber optic adapter 100. Removal includes moving the wedge-shaped tabs 172 of the connector latch 144 from their interference position with the stops 24 on the plug frame 20 and withdrawing the connector 14 from the fiber optic adapter 100. To move the wedge-shaped tabs 172 out of an interference position with the stops 24, the technician slides the shell 22 relative to the plug frame 20 in the direction of arrow 194. The shell 22 engages the ears 178 thereby pushing the wedge-shaped tabs 172 outwardly relative to the stops 24, as shown. This outward motion of the wedge-shaped tabs 172 also moves the protrusions 176 outwardly to engage the housing engagement arms 156 through the through-slot 168. This movement disengages the housing engagement arms 156 from the ledges 158 (shown in FIG. 10). Once the wedge-shaped tabs 172 clear the stops 24 and the sliding latch 142 is freed from ledge 158, the connector 14 is movable in the direction of arrow 194 and so is removable from the fiber optic adapter 100. Further, once the sliding latch 142 is freed from the ledge 158, the compressed springs 140 apply force in the direction of arrow 194 and may aid the technician in removal of the connector 14 from the adapter 100.

With reference to an exemplary embodiment shown in FIGS. 12-19, a fiber optic adapter 200 may forcibly move a connector 14 (shown in FIGS. 1 and 15-19) from the adapter 200 if the connector 14 is improperly installed during installation. The fiber optic adapter 200 functions much like the fiber optic adapter 100 shown in FIGS. 4-11. The interaction of the fiber optic adapter 200 with the connector 14 is described with reference to FIGS. 15-17. In this exemplary embodiment, if the installer fails to insert the connector 14 far enough into the fiber optic adapter 200, once the installer releases the connector 14, the adapter 200 will spontaneously push the connector 14 backwards and in a direction out of the adapter 200. In essence, in one embodiment, if the installer fails to properly insert the connector 14, it pops back out. Stated another way, the fiber optic adapter 200 automatically uninstalls an incompletely inserted connector. This forcible movement of the connector 14 may be accompanied by an audible response, such as a click or snap, and so may further attract the installer's attention to an incomplete installation. Advantageously, if the forcible movement results in ejection of an improperly installed connector 14, this provides a visual indication to the installer that the connector 14 was not properly seated. In that situation, the installer may reattempt to insert the connector 14 into the fiber optic adapter 200 with sufficient force to ensure that the connector 14 is inserted far enough to lock the connector 14 in the adapter 200.

Alternatively, if the connector 14 is not fully ejected from the fiber optic adapter 200, the forcible movement of the connector 14 in a direction opposite the direction of installation may result in sufficient movement of the connector 14 to increase a gap between the fiber optic connections (e.g., between two ferrules (not shown) terminating ends of fiber optic cables, such as the cables 10 and 12 shown in FIG. 1). The gap produced may be sufficient to interrupt signal transmission, and as such, the connector 14 will fail a transmission signal check following installation thereby alerting the installer of the improper connection.

Once the connector 14 is properly seated in the fiber optic adapter 200, optical transmission through the connection and sustained service is assured. While a simplex connector is shown and described, embodiments of the invention are not limited to use with simplex connectors. For example, it is contemplated that fiber optic adapters according to embodiments may be used with duplex and quad connectors. Further, while SC connectors are shown, embodiments are not limited to SC connectors, as MU connectors are contemplated.

Figure 12:
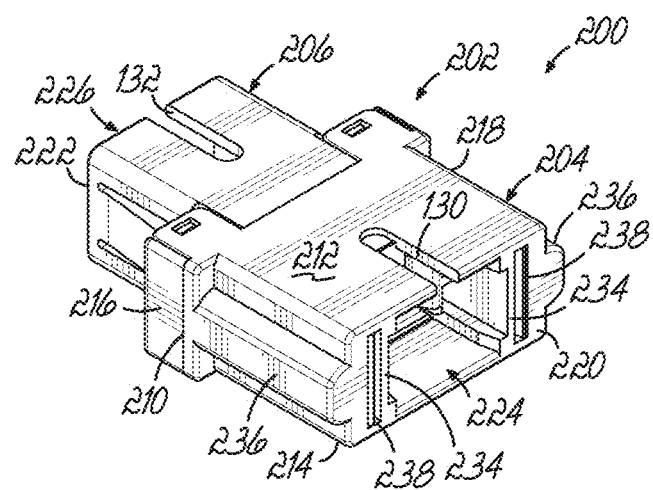
FIG. 12 is a perspective view of a fiber optic adapter according to another embodiment of the disclosure.
Figure 13:
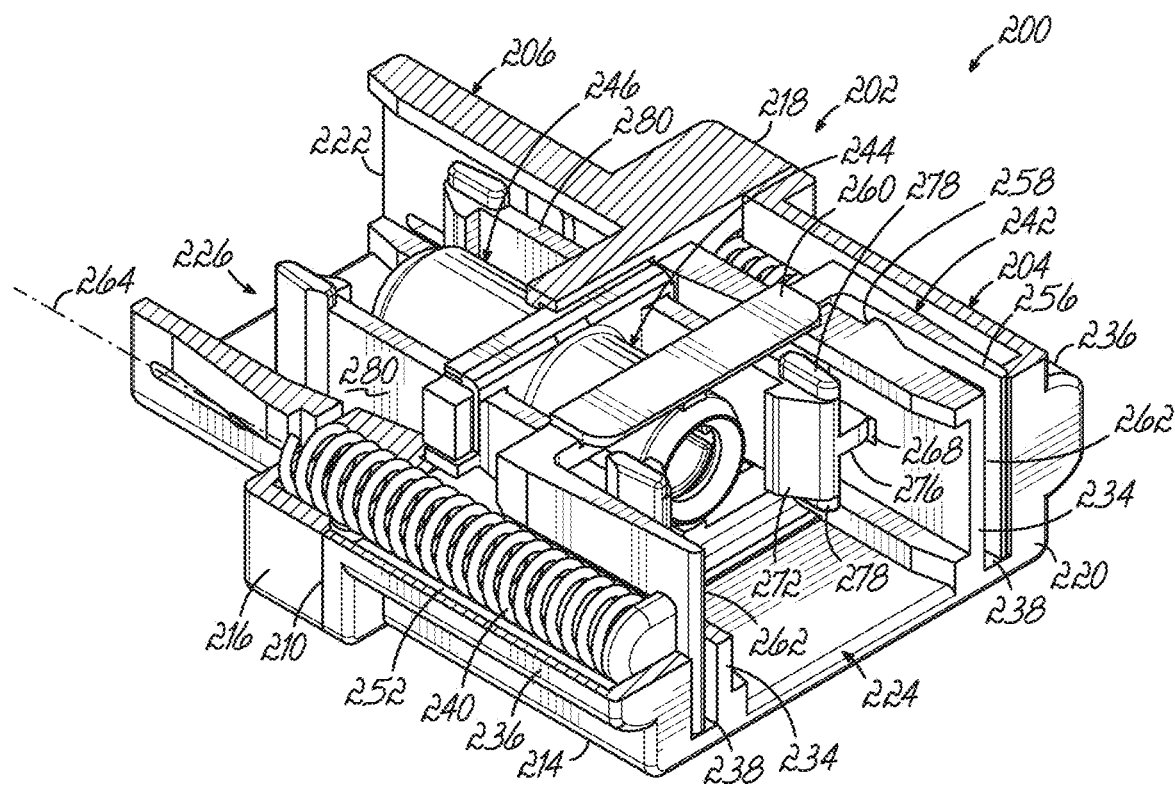
FIG. 13 is a partial cross-sectional perspective view of the embodiment of the fiber optic adapter shown in FIG. 12.
Figure 14:
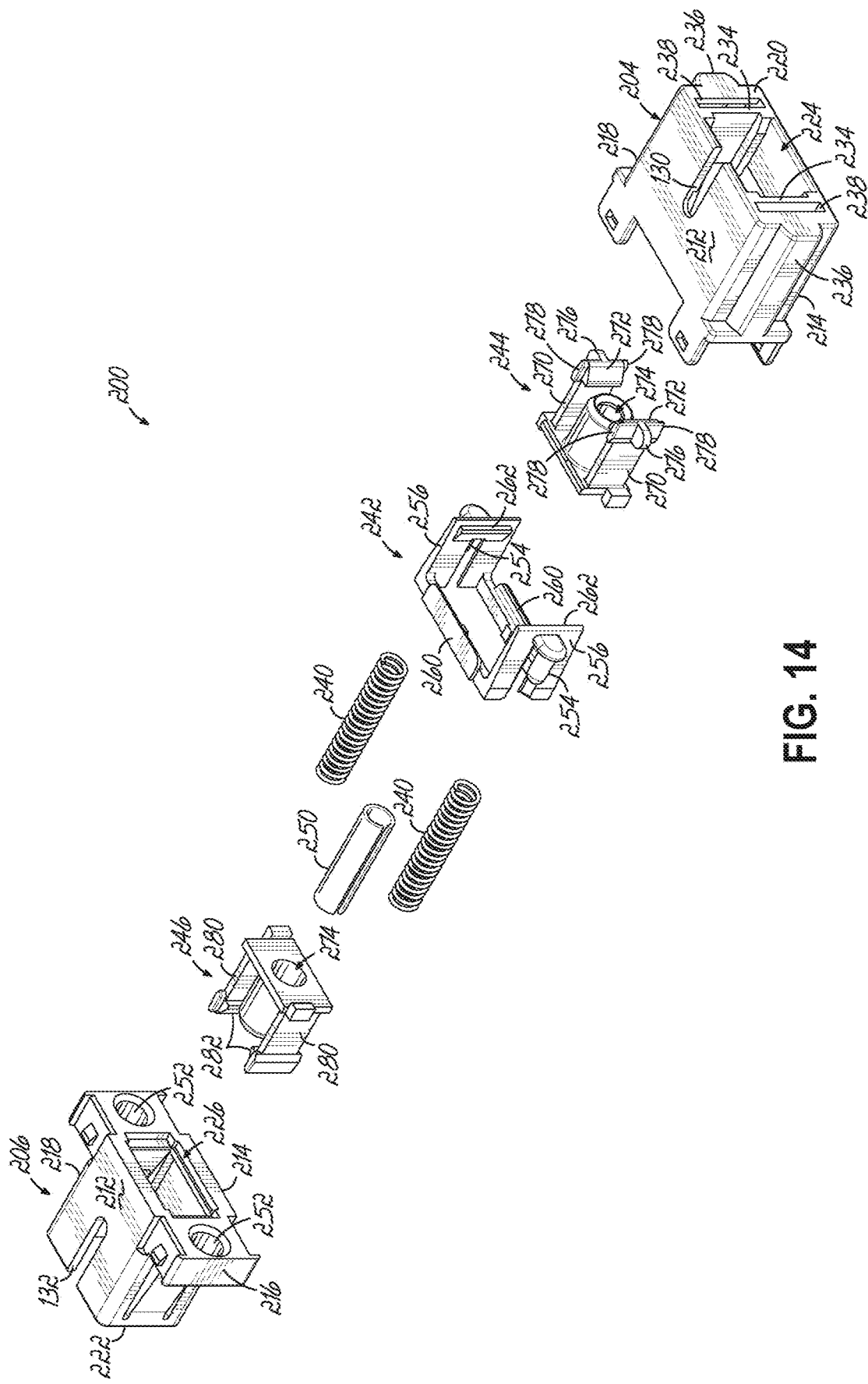
FIG. 14 is a disassembled perspective view of the fiber optic adapter shown in FIG. 12.

With reference to FIGS. 12, 13, and 14, in one embodiment, the fiber optic adapter 200 includes a housing 202 having two portions 204, 206 which are joined together, for example, at a joint 210 (a snap fit construction is shown). The housing 202 is generally rectangular in shape and differs from the housing 102 of fiber optic adapter 100 in shape but having sides 212, 214, 216, and 218 and opposing ends 220 and 222. The ends 220 and 222 define cavities 224 and 226, respectively, for receiving a respective one of connectors 14, 16 (shown in FIG. 1). One of the sides, such as side 212, includes alignment slots 130, 132 that open to a respective cavity 224, 226 and receive a portion of the connector 14, 16. The slots 130, 132 ensure that the connector 14, 16 is inserted in a predetermined orientation.

One end, such as end 220, includes one or more dividers 234 that defines passageways 238 adjacent the cavity 224. In the exemplary embodiment shown, there is a pair of passageways 238 that are spaced apart by the cavity 224. Sides 216, 218 of the housing portion 204 may include silos 236 that generally project from the side 216 of the housing portion 204. The housing 202 differs from the housing 102 (FIG. 4) in the location of the silos 236 in view of the rearrangement of springs within the housing 202, described below. Advantageously, this provides a housing 206 that is more similar in shape and size relative to current adapters and thus, the fiber optic adapter 200 may find use in those applications. The fiber optic adapter 200 includes cavities 224 and 226 which receive connectors 14, 16 and may be a female-to-female type adapter to receive connectors 14, 16 at each end 220 and 222. Although not shown, the end 222 may be provided with a male connector. With the male connector at end 222 and the cavity 224 at the opposing end 220, the fiber optic adapter 200 may be a male-to-female type adapter.

With reference now to FIGS. 13 and 14, in the exemplary embodiment shown, the housing 202 contains one or more springs 240 that in cooperation with a sliding latch 242 provide a force sufficient to move a connector outwardly from within the cavity 224 if the connector is not fully inserted to a locked position in the fiber optic adapter 200. In the embodiment shown, two springs 240 are engaged with the sliding latch 242 and spaced apart at the sides 216, 218 of the housing 202. Embodiments of the invention are not limited to two springs 240. That is, it is within the scope of the present disclosure that alternate number of springs 240 may be used. The spring force may be sufficient to eject a connector from the cavity 224 or at a minimum be sufficient to move a connector in an outward direction from the cavity 224 by a distance sufficient to degrade or prevent optical transmission in fiber optic cable 10. In either condition, an installer may either visually identify the improper installation or identify the poor optical transmission during a transmission quality check following installation.

Figure 15:
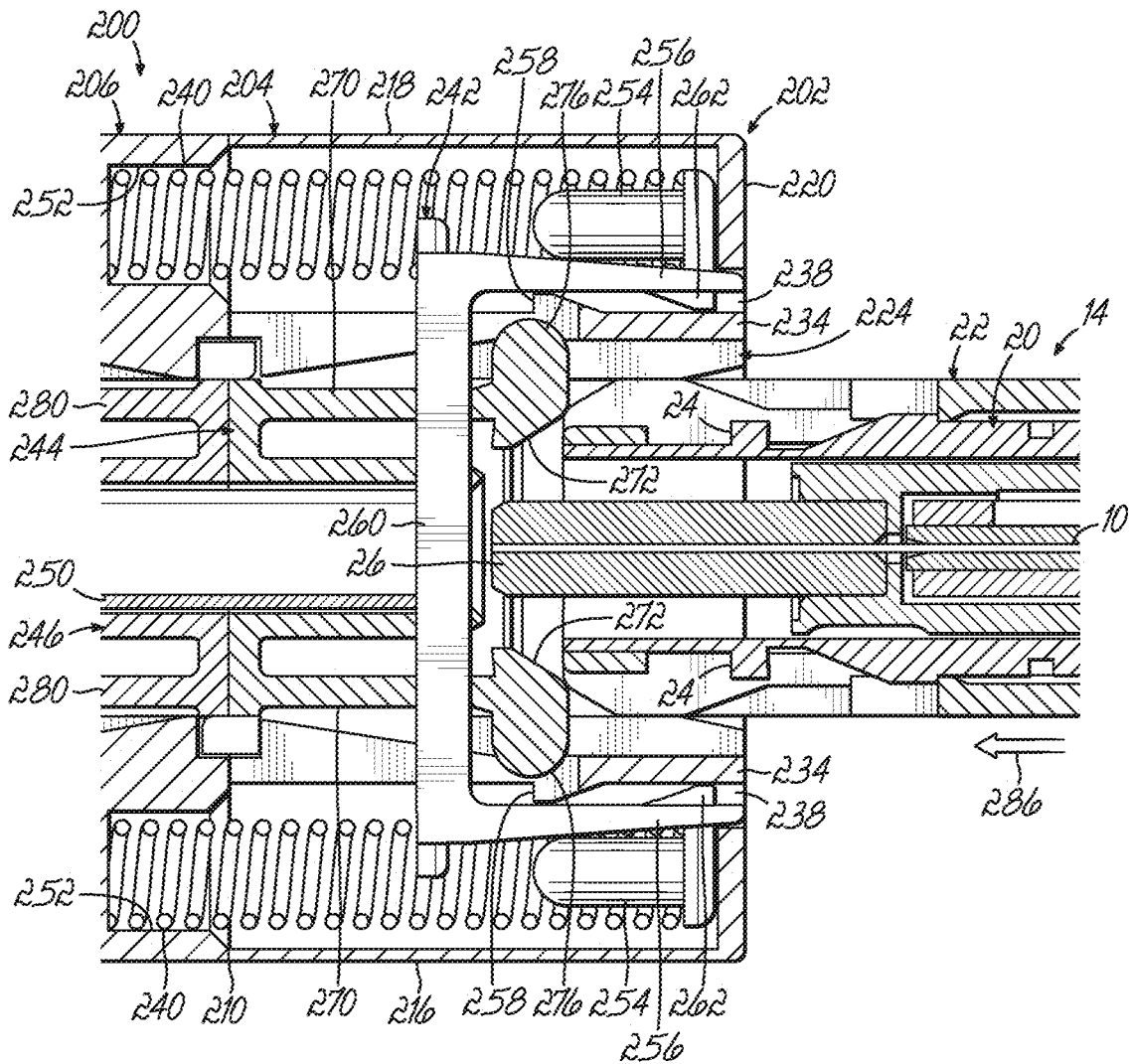
FIGS. 15-17 are schematic sectional views of the fiber optic adapter of FIG. 12 illustrating a sequence of inserting a connector into the fiber optic adapter during installation.
Figure 16:
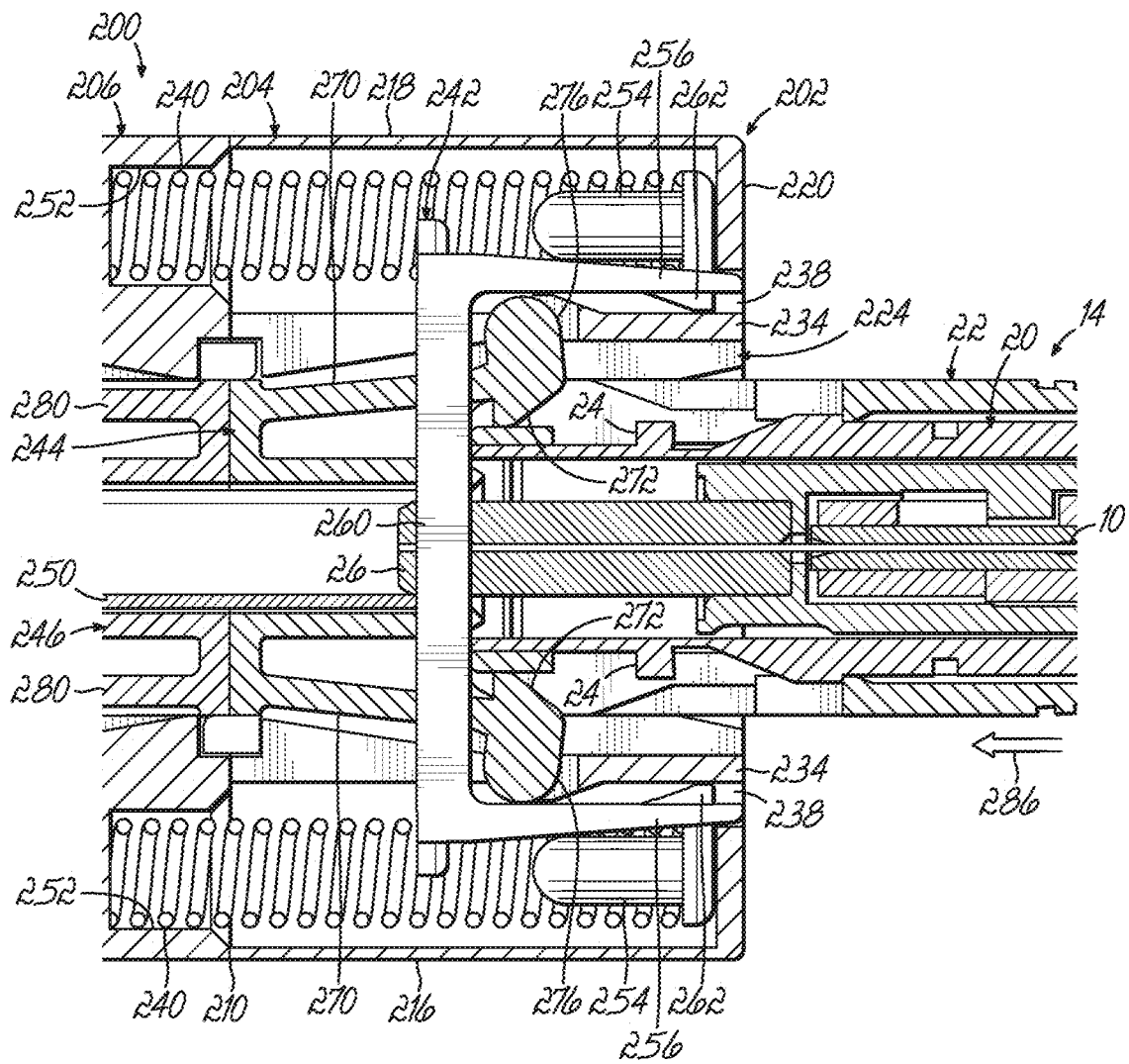
Figure 17:
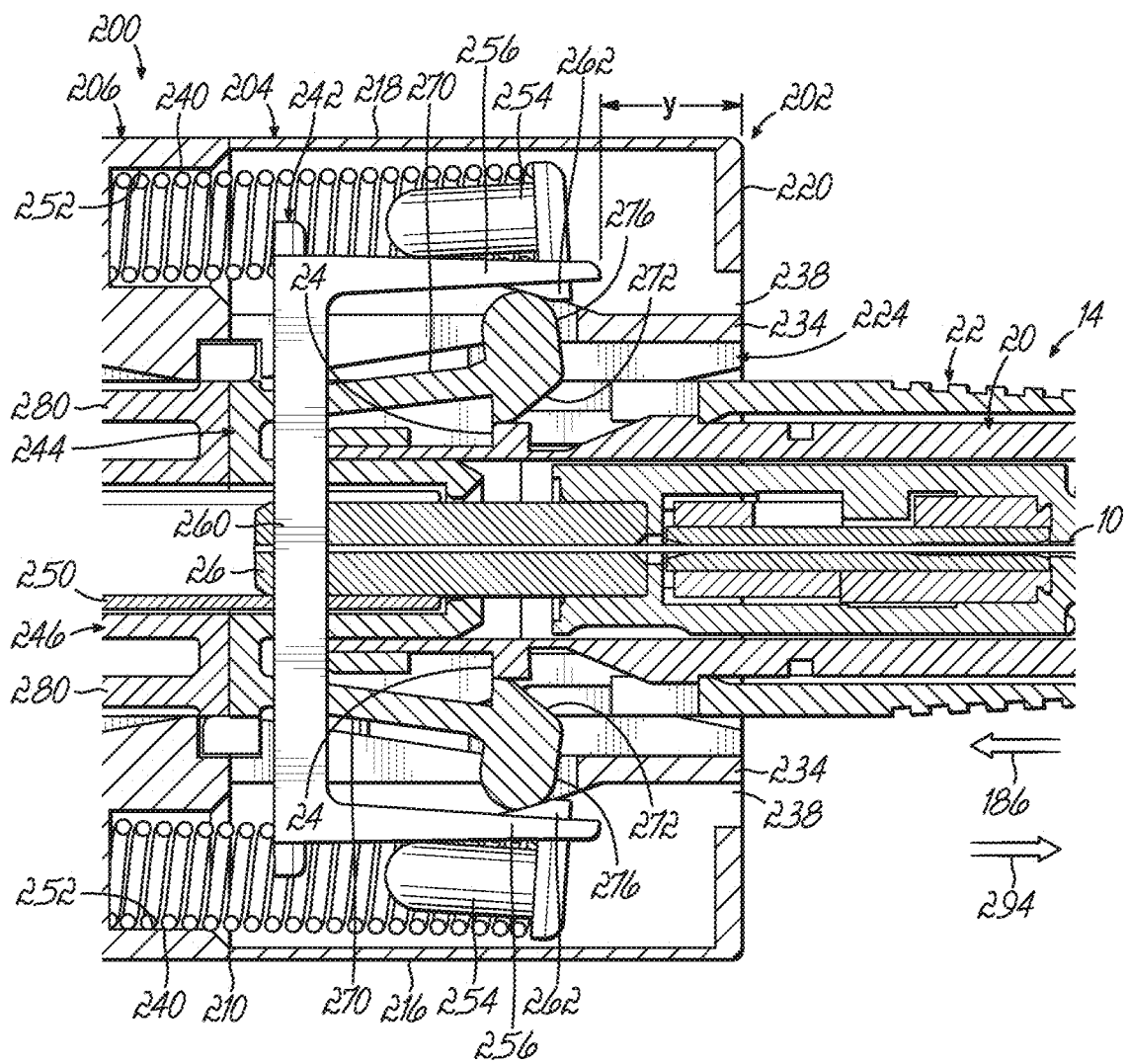

In addition to the springs 240 and sliding latch 242, the housing 202 contains a connector latch 244 abutting a sleeve holder 246. The connector latch 244 may be coupled to the sleeve holder 246. The connector latch 244 and sleeve holder 246 collectively house a sleeve 250 in receptacle 274. The connector latch 244 and the sleeve holder 246 are configured to couple connectors (e.g., connectors 14 and 16 of FIG. 1) within cavities 224 and 226, respectively. By way of example, FIGS. 15-17 illustrate a connector 14 inserted into cavity 224, as described below.

In one embodiment, the silos 236 of the housing portion 206 define cavities 252 that receive the springs 240 and provide a surface against which the springs 240 may be compressed during insertion of a connector. The sliding latch 242 includes nipples 254 that receive an opposing end of springs 240. The springs 240 are therefore compressible between the sliding latch 242 and the housing portion 206 during use of the fiber optic adapter 200 with the cavities 252 and nipples 254 define a compression axis 264 for each spring 240. This is shown in FIG. 13, which depicts the fiber optic adapter 200 with springs 240 in a position to be compressed. The sliding latch 242 and springs 240 are movable in the housing 202 and relative to the connector latch 244, as is schematically shown in FIGS. 15-17, described below.

The sliding latch 242 further includes a pair of housing engagement arms 256 that cooperate with the housing portion 204 when a connector is fully inserted into the cavity 224. As shown, the nipples 254 are located toward end 220 so that the springs 240 are largely contained in the housing portion 204. A pair of cross beams 260 extend between the engagement arms 256 so that the beams 260 and arms 256 collectively with define a rectangular opening in the sliding latch 242. The rectangular opening receives the connector latch 244. A connector inserted into cavity 224 may contact the cross beams 260. Each of the housing engagement arms 256 includes a stop 262 (shown in FIGS. 15-19) extending inwardly to engage the housing portion 204 at ledges 258 (shown in FIG. 18) during insertion of a connector. In the exemplary embodiment, the ledges 258 are formed on the dividers 234 in the passageway 238. The dividers 234 also include a through-slot 268 that receives a portion of the connector latch 244. The through-slot 268 may be proximate each ledge 258 and provide an opening between the cavity 224 and the passageway 238. As shown in FIG. 12, tips of the arms 256 may be observable through passageways 238 on the end 220 of the fiber optic adapter 200. In embodiments where the passageways 238 do not open at the end 220, the arms 256 are not visible from end 220.

With continued reference to FIGS. 13 and 14, in the exemplary embodiment, the connector latch 244 is substantially the same as connector latch 144 shown in FIG. 5 and is contained in the housing portion 204 proximate the cavity 224. The connector latch 244 is configured to latch a connector in the cavity 224 to the housing 202. In that regard, the connector latch 244 includes a pair of engagement arms 270 having wedge-shaped tabs 272. Wedge-shaped tabs 272 face inwardly in the cavity 224 and function much like the tabs 50 of the engagement portion 34 shown in FIG. 2. The engagement arms 270 also include a protrusion 276 extending outwardly from each arm 270 opposite the wedge-shaped tabs 272. As shown in FIG. 13, the protrusions 276 are positioned proximate or in the through-slot 268 in the dividers 234 and are movable relative to the through-slot 268 to engage the housing engagement arms 256 of the sliding latch 242 during insertion of a connector into cavity 224, as is described below. In addition, an ear 278 extends laterally outward (e.g., toward the sides 112 and 114 of the housing portion 104) from the arm 270 between the protrusion 276 (and may be generally perpendicular to the protrusions 276) and the tabs 272 and is configured to contact a shell of a connector.

As mentioned previously, the sleeve holder 246 is received in the housing portion 206 and abuts the connector latch 244. The sleeve holder 246 is configured to couple a connector that is inserted into the cavity 226. In that regard, the sleeve holder 246 includes engagement arms 280 having wedge-shaped stops 282 much like engagement arms 270 and wedge-shaped tabs 272 of the connector latch 244. The wedge-shaped tabs 272 engage stops on the plug frame 20 of the connector. The sleeve holder 246 and the connector latch 244 define the receptacle 274 that receive the sleeve 250.

With reference to FIGS. 15-17, insertion of a connector 14 into the fiber optic adapter 200 is shown. In FIG. 15, an installer inserts the connector 14 according to arrow 286 into the cavity 224 on the end 220 of the fiber optic adapter 200. This may occur before or after insertion of a connector into the cavity 226 (not shown). In the cavity 224, the connector 14 contacts the connector latch 244 at the engagement arms 270. Although not shown, initial contact of the shell 22 is at the ears 278. With the connector 14 in this position, the springs 240 are extended so that the sliding latch 242 is at its fully extended, unlatched position. Although not shown, the springs 240 may be initially compressed though that compression may be minimal. The housing engagement arms 256 may be visible in the passageways 238 when the sliding latch 242 is in its fully extended position.

With reference to FIG. 16, when the installer pushes the connector 14 further into the cavity 224 (according to arrow 286), the engagement arms 270 of the connector latch 244 are deflected outwardly toward the sides 216, 218. In that regard, the forcible insertion of the connector 14 pushes the shell 22 against the ears 278 thereby pushing the tabs 272 apart. As the wedge-shaped tabs 272 are deflected outwardly toward the sides 216, 218, the protrusions 276 of the engagement arms 270 extend further through the through-slot 268 in the divider 234 and protrude into passageways 238. In the position shown in FIG. 16, the connector 14 may initially contact the cross beams 260 of the sliding latch 242 though the springs 140 may not be appreciably compressed by that contact. Because the ferrule 26 may protrude slightly beyond the plug frame 20, the ferrule 26 may extend slightly into a recess formed by the sleeve 250.

With reference to FIG. 17, further forcible insertion of the connector 14 into the cavity 224 pushes on the sliding latch 242 and compresses the springs 240. As the installer pushes the connector 14 further into the cavity 224, the plug frame 20 and/or shell 22 contacts the cross beam 260 of the sliding latch 242. Movement of the sliding latch 242 according to arrow 190 compresses the springs 240 and brings the protrusions 176 into contact with the housing engagement arms 256 as the protrusions 276 are deflected outward by contact between the ears 278 and the shell 22 of the plug frame 20.

At the position shown in FIG. 17, while the connector 14 is inserted into the fiber optic adapter 200, the connector 14 is not yet locked or latched to the fiber optic adapter 200. If the technician releases the connector 14 at this location, the springs 240 will push the connector 14 via the sliding latch 242 in the direction of arrow 294. The compressed springs 140 apply a force in a direction opposite to that of insertion. Thus, in the absence of the installer holding onto the connector 14, the compressed springs 240 will spontaneously act in a direction opposite to that of insertion. As set forth above, a force of the springs 240 produced by displacement y (labeled in FIG. 17) from the initial position of the sliding latch 242 to the position of the sliding latch 242 just before a latched/locked position is achieved (shown in FIG. 18) may be sufficient to push the connector 14 from the cavity 224. By way of example, a spring constant according to Hooke's law of one spring 240 according to embodiments of the invention may range from 0.7 N/mm to 2.4 N/mm.

If the springs 240 eject the connector 14 from the fiber optic adapter 100, this provides a visual indication that the connector 14 was not fully inserted and latched in the fiber optic adapter 200. Alternatively, movement of the connector 14 in the direction of arrow 294 (FIG. 17) is sufficient to cause optical transmission failure to/from the optical fiber 10 due to larger spacing between the optical fibers. Thus, failure to fully insert the connector 14 to a latched/locked position results in an optical transmission signal failure that should be identified when the installer performs a signal quality check. As such, the incompletely inserted connector 14 is identified during installation and reduces or eliminates the need to dispatch a technician at a later time to investigate transmission degradation/failure due to incompletely installed connectors as is described above in FIGS. 1-3.

Figure 18:
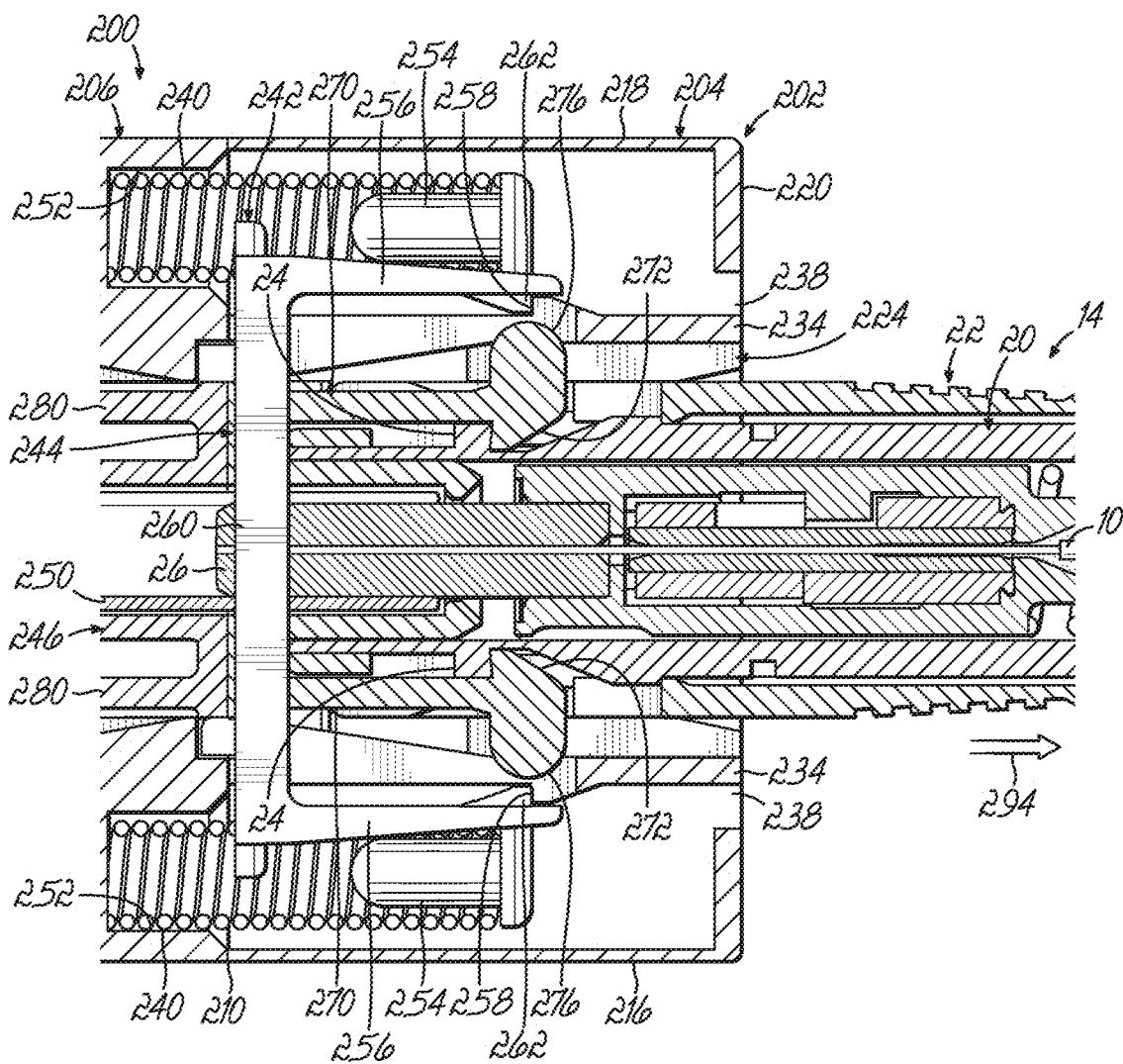
FIG. 18 is a schematic sectional view of the fiber optic adapter of FIG. 12 with a connector in an installed position.

With further insertion of the connector 14 into the fiber optic adapter 100 from the position shown in FIG. 17 to the position shown in FIG. 18, a latched/locked position is reached. In this position, the connector 14 is locked to the fiber optic adapter 200. That is, the connector 14 and the adapter 200 resist their inadvertent separation. To that end, with further movement of the sliding latch 242 in the direction of arrow 286 (FIG. 17), the stops 24 of the plug frame 20 move past the wedge-shaped tabs 272. This permits the engagement arms 270 to spring back toward their undeflected positions. The wedge-shaped tabs 272 move to a position in which they form an interference fit to limit movement of the stop 24 on the plug frame 20 in a direction indicated by arrow 294. The stops 24 are then positioned between the wedge-shaped tabs 272 and the sleeve holder 246 and are effectively trapped in the fiber optic adapter 200. Thus, the connector 14 is latched to the fiber optic adapter 200 at this position. This configuration resists inadvertent, unintentional removal of the connector 14 from the fiber optic adapter 200.

In the exemplary embodiment, once the engagement arms 270 are released and move toward their original, undeflected positions, the corresponding protrusions 276 disengage from contact with the housing engagement arms 256. The housing engagement arms 256 therefore also move toward their original, undeflected positions (or inwardly toward the connector 14) to engage with the dividers 234. The stops 262 on the housing engagement arms 256 engage the ledges 258 on the divider 234 to form an interference fit. This interference fit resists movement of the sliding latch 242 from force applied by the compressed springs 240 in the direction of arrow 294. Once contact is made between the sliding latch 242 and the housing 202 at this location, a substantial portion or all of the force from the compressed springs 240 is carried by the housing 202 via the ledges 258 on the dividers 234 and not by the stops 24 and wedge-shaped tabs 272. Advantageously, the force from the compressed springs 240 is not carried appreciably by the connector 14 and the connector latch 244. This arrangement is believed to prolong the life of the connector 14 and/or prevent physical damage to the connector 14 over time.

Figure 19:
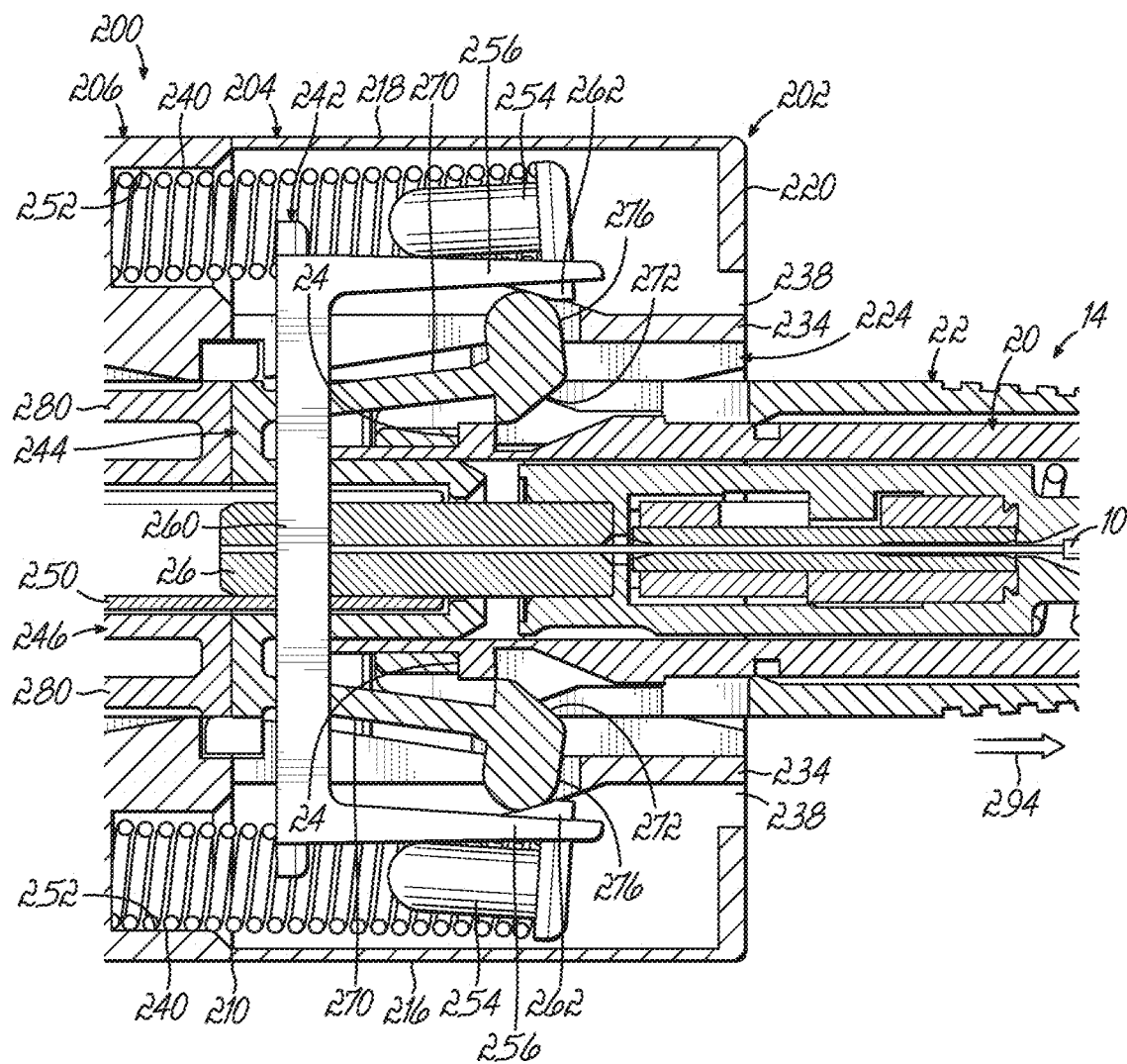
FIG. 19 is a cross-sectional view of the adapter of FIG. 12 illustrating disassembly of the connector from the fiber optic adapter following installation.

With reference to FIG. 19, while the fiber optic adapter 200 resists unintentional, inadvertent removal of the connector 14 when it is in the latched position (shown in FIG. 18), a technician can remove the connector 14 from the fiber optic adapter 200. Removal includes moving the wedge-shaped tabs 272 of the connector latch 244 from their interference position with the stops 24 on the plug frame 20 and withdrawing the connector 14 from the fiber optic adapter 200 along the direction of arrow 294. To move the wedge-shaped tabs 272 out of the interference position with the stops 24, the technician slides the shell 22 relative to the plug frame 20 in the direction of arrow 294. The shell 22 engages the ears 278 pushing them outwardly. This movement pushes the wedge-shaped tabs 272 outward relative to the stops 24, as shown. This outward motion of the wedge-shaped tabs 272 also moves the protrusions 276 outwardly to engage the housing engagement arms 256 through the through-slot 268. This movement disengages the housing engagement arms 256 from the ledges 258, and the sliding latch 242 is free to move in the direction of arrow 294. Once the wedge-shaped tabs 272 clear the stops 24, and the sliding latch 242 is freed from ledge 258, the connector 14 is movable in the direction of arrow 294 and so is removable from the fiber optic adapter 200. Once the sliding latch 242 is freed from the ledge 258, the compressed springs 240 apply force in the direction of arrow 294 and may aid a technician in removal of the connector 14 from the adapter 200.

With reference to an exemplary embodiment shown in FIGS. 20-29, a fiber optic adapter 300 differs from the fiber optic adapters 100 and 200 in that the fiber optic adapter 300 provides a visual indication when a connector 14 (shown in FIG. 1) is improperly installed during installation. The visual indication is separate from any spring-effected movement of the connector within the adapter. In other words, while the fiber optic adapter 300 may provide a spring force that opposes the insertion of a connector, similar to the fiber optic adapters 100 and 200, described above, the fiber optic adapter 300 also includes an indicator flag that indicates when a connector is properly installed. The indicator flag protrudes from and remains fully extended until the connector is properly latched into the fiber optic adapter 300, at which point the flag is withdrawn into the adapter. The flag withdrawal is abrupt and occurs only when the connector is at or nearly at the latched position. In effect, the flag provides the technician with a visual go/no-go indication during installation of a connector. The interaction of the fiber optic adapter 300 with the connector 14 is described with reference to FIGS. 23-29. While a simplex connector is shown and described, embodiments of the invention are not limited to use with simplex connectors. For example, it is contemplated that fiber optic adapters according to embodiments may be used with duplex and quad connectors. Further, while SC connectors are shown, embodiments are not limited to SC connectors, as MU connectors are contemplated.

Figure 20:
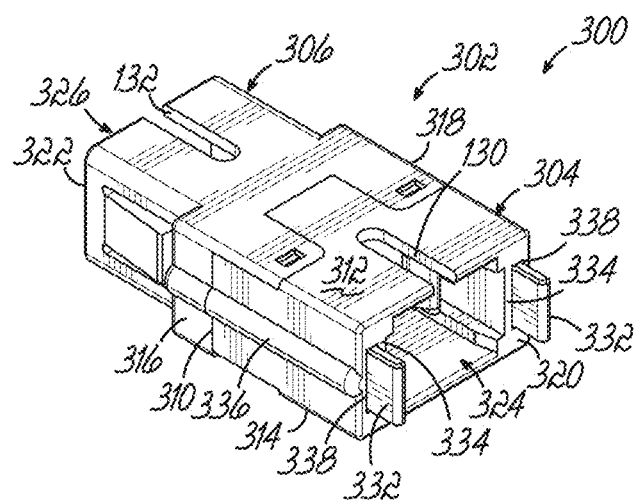
FIG. 20 is a perspective view of a fiber optic adapter according to another embodiment of the disclosure.
Figure 21:
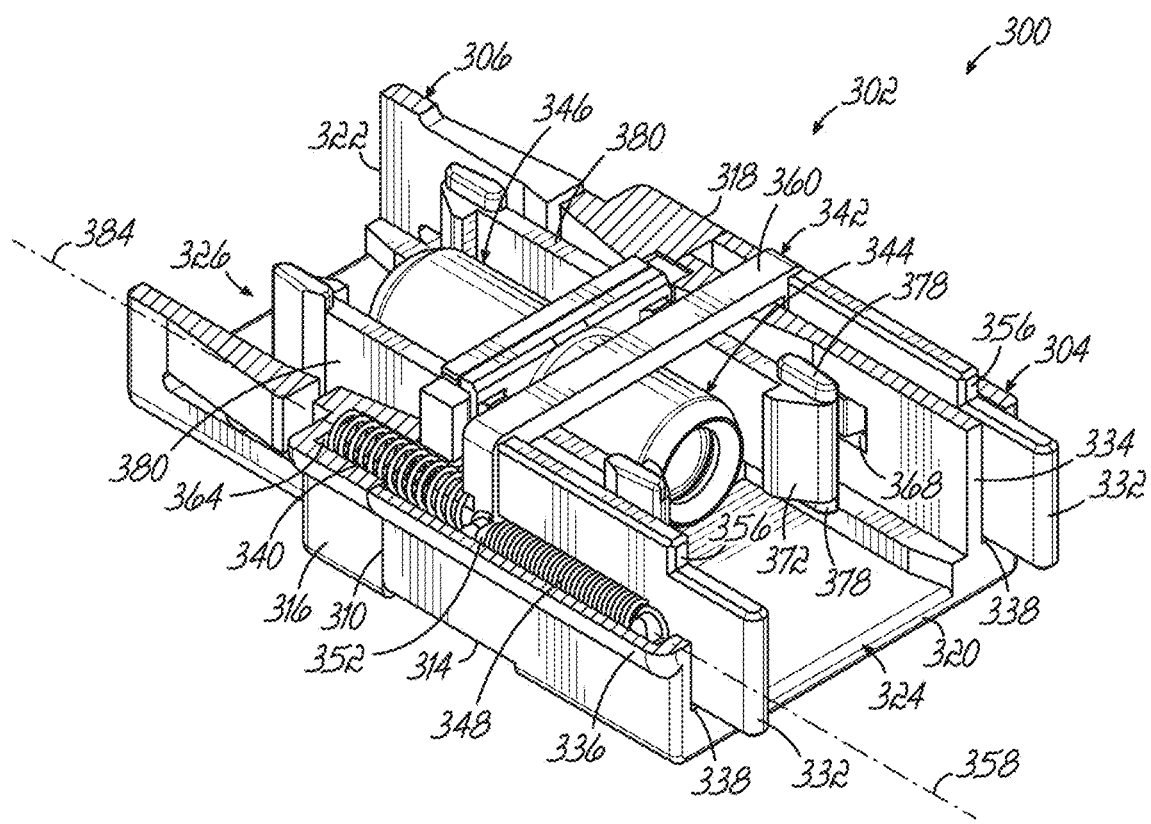
FIG. 21 is a partial cross-sectional perspective view of the embodiment of the fiber optic adapter shown in FIG. 20.
Figure 22:
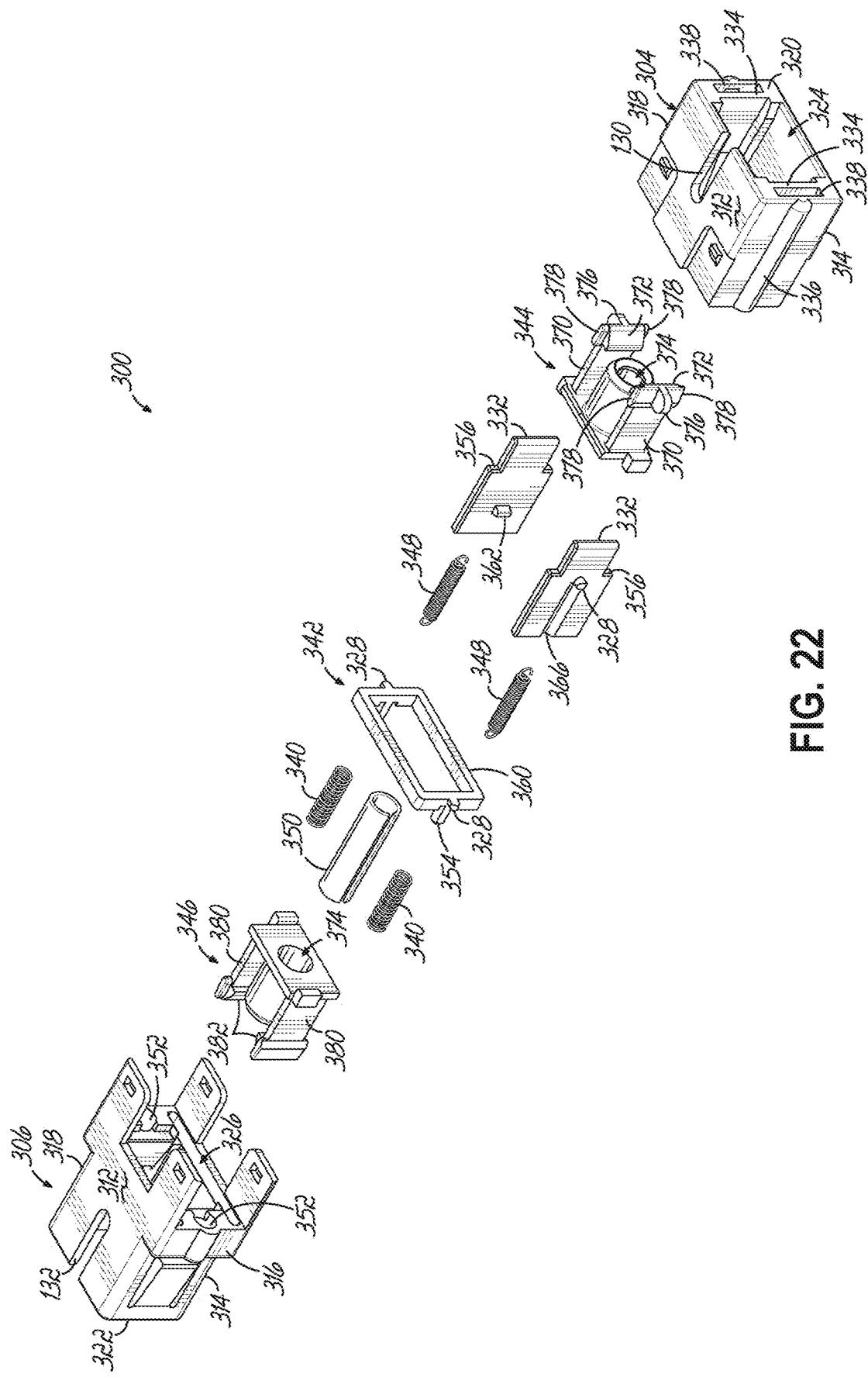
FIG. 22 is a disassembled perspective view of the fiber optic adapter shown in FIG. 20.

With reference to FIGS. 20, 21, and 22, in one embodiment, the fiber optic adapter 300 includes a housing 302 having two portions 304, 306 which are joined together, for example, at a joint 310 (a snap fit construction is shown).

The housing 302 is generally rectangular in shape having sides 312, 314, 316, and 318 and opposing ends 320 and 322. The ends 320 and 322 define cavities 324 and 326, respectively, for receiving a respective one of connectors 14, 16 (shown in FIG. 1). One of the sides, such as side 312, includes alignment slots 130, 132 that open to a respective cavity 324, 326 and receive a portion of the connector 14, 16. The slots 130, 132 ensure that the connector 14, 16 is inserted in a predetermined orientation. The fiber optic adapter 300 may be a female-to-female type adapter to receive connectors 14, 16 at each end 320 and 322. Although not shown, the end 322 may be provided with a male connector. With the male connector at end 322 and the cavity 324 at the opposing end 320, the fiber optic adapter 300 may be a male-to-female type adapter.

Further, one end, such as end 320, includes one or more dividers 334 that defines passageways 338 adjacent the cavity 324. In the exemplary embodiment shown, there is a pair of passageways 338 that are spaced apart by the cavity 324. The dividers 334 include a through-slot 368 (shown in FIG. 21) that provides an opening between the cavity 324 and the passageway 338. An indicator flag 332 extends from the passageways 338. Each of the indicator flags 332 is movable in the passageway 338 from an extended position as is shown in FIG. 20, in which each indicator flag 332 is at its maximum extension from the housing 302, to a retracted position, which is shown in FIG. 26, in which the indicator flags 332 are fully within the housing 302. However, it will be appreciated that in the retracted position, there may be a minimal portion of the indicator flag 332 either visible in the passageway 338 or a minimal portion of the indicator flag 332 may extend beyond the housing 302 (due to dimensional tolerances and play during design and manufacturing of the adapter 300). The indicator flags 332 may be a different color than the color of the housing 302. For example, the indicator flags 332 may be red while the housing 302 is white or gray. The retraction of the indicator flags 332 from the extended position to the retracted position occurs when a connector is fully inserted and latched in the cavity 324. The retraction of the indicator flags 332 is described with reference to FIGS. 23-26. Each of the indicator flags 332 further includes a pair of shoulders 356 and cooperate with the passageways 338 in the housing portion 304 to stop outward movement of the indicator flags 332.

With continued reference to FIGS. 20, 21, and 22, sides 316, 318 of the housing portion 304 may include silos 336 that generally project from the side 316 of the housing portion 304. The silos 336 may form cavities 352 that receive one or more springs 340. In cooperation with a sliding latch 342, the springs 340 provide resistance to insertion of a connector into cavity 324. The sliding latch 342 includes a rectangular shaped frame 360 from which nipples 354 extend to receive ends of springs 340. In that regard, the springs 340 are compressed when a connector is inserted into the cavity 324 and contacts the frame 360. When the spring 340 are compressed, the force from the compressed springs may be sufficient to move the sliding latch 342 and may also push a connector outwardly from within the cavity 324 if the connector is not fully inserted to a locked position in the fiber optic adapter 300. In the embodiment shown, two springs 340 are engaged with the sliding latch 342 and are shown spaced apart at the sides 316, 318 in respective silos 336 of the housing 302. Embodiments of the invention are not limited to two springs 340. That is, it is within the scope of the present disclosure that alternate number of springs 340 may be used. The spring force may be sufficient to move a connector in an outward direction from the cavity 324 by a distance sufficient to degrade or prevent optical transmission in fiber optic cable 10. An installer may therefore identify poor optical transmission during a transmission quality check following installation.

With reference to FIGS. 21 and 22, the housing 302 contains one or more additional springs 348 coupled to the sliding latch 342 via nub 328 at one end and to the indicator flags 332 at the other end via nub 328 on the flag 332. In that regard, the springs 348 are extended along an extension axis 358 when a connector is inserted into the cavity 324. When extended, the springs 348 are configured to withdraw the indicator flags 332 when the connector is fully inserted to a locked position in the fiber optic adapter 300. Retraction of the indicator flags 332 is described in greater detail below. Each of the indicator flags 332 includes a stop 362 (shown in FIGS. 23-29) extending inwardly which are engaged to permit extension of the springs 348. In the embodiment shown, two springs 348 are engaged with the sliding latch 342 and are shown spaced apart at the sides 316, 318 in respective silos 336 of the housing 302. Embodiments of the invention are not limited to two springs 348. It is within the scope of the present disclosure that alternate number of springs 348 may be used.

In one embodiment, the silos 336 of the housing portion 306 and channels 366 in indicator flags 332 define the cavities 352 that receive the springs 348. The cavities 352 also receive springs 340 and include a surface 364 against which one end of the springs 340 may be compressed during insertion of a connector. The springs 340 are compressible between the sliding latch 342 and the surface 364 during insertion of a connector into cavity 324 with the cavities 352 and nipples 354 defining a compression axis 384 for each spring 340. Compression axis 384 of the springs 340 may align with extension axis 358 of the springs 358 or they may be offset from one another. This is shown in FIG. 21, which depicts the fiber optic adapter 300 with springs 340 in a compressible position. The sliding latch 342, compression springs 340, extension springs 348, and indicator flags 332 are movable in the housing 302, as is schematically shown in FIGS. 23-26, described below.

With reference to FIGS. 21 and 22, in addition to the springs 340 and sliding latch 342, the housing 302 contains a connector latch 344 abutting a sleeve holder 346. The connector latch 344 may be coupled to the sleeve holder 346. The connector latch 344 and sleeve holder 346 collectively house a sleeve 350 in receptable 374. The connector latch 344 and the sleeve holder 346 are configured to couple connectors (e.g., connectors 14 and 16 of FIG. 1) within cavities 324 and 326, respectively. By way of example, FIGS. 23-26 illustrate a connector 14 being inserted into cavity 324, as is described below. The rectangular frame 360 of the sliding latch 342 receives the connector latch 344.

With continued reference to FIGS. 21 and 22, in the exemplary embodiment, the connector latch 344 is substantially the same as connector latches 144 and 244 described above and is contained in the housing portion 304 proximate the cavity 324. The connector latch 344 is configured to latch a connector in the cavity 324 to the housing 302. In that regard, the connector latch 344 includes a pair of engagement arms 370 having wedge-shaped tabs 372. Wedge-shaped tabs 372 face inwardly and cooperate with a connector to capture the connector in the cavity 324. The engagement arms 370 also include a protrusion 376 extending outwardly from each arm 370 opposite the wedge-shaped tabs 372. As shown in FIG. 21, the protrusions 376 are positioned proximate the indicator flags 332 and are movable outwardly to engage the stops 362 of the indicator flags 332 during insertion of a connector into cavity 324, as is described below. In addition, an ear 378 extends laterally outward (e.g., toward the sides 312 and 314 of the housing portion 304) from the arm 370 between the protrusion 376 (and may be generally perpendicular to the protrusions 376) and the tabs 372 and is configured to contact a shell of a connector.

The sleeve holder 346 is received in the housing portion 306 and abuts the connector latch 344. The sleeve holder 346 is configured to couple a connector that is inserted into the cavity 326. In that regard, the sleeve holder 346 includes engagement arms 380 having wedge-shaped stops 382 much like engagement arms 370 and wedge-shaped tabs 372 of the connector latch 344. The wedge-shaped tabs 372 engage stops on the plug frame of a connector. The sleeve holder 346 and the connector latch 344 collectively define the receptacle 374 that receive the sleeve 350.

Figure 23:
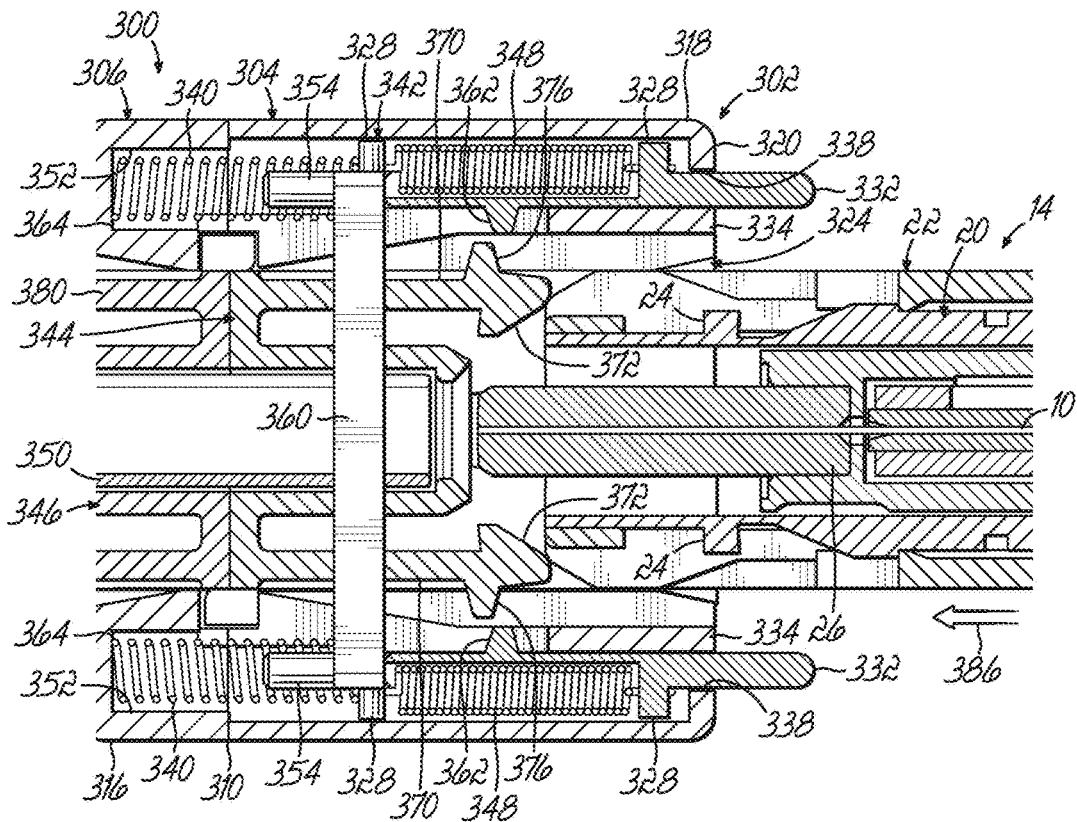
FIGS. 23-25 are schematic sectional views of the fiber optic adapter of FIG. 20 illustrating a sequence of inserting a connector into the fiber optic adapter during installation.

With reference to FIGS. 23-26, insertion of a connector 14 into the fiber optic adapter 300 is shown. In FIG. 23, an installer inserts the connector 14 according to arrow 386 into the cavity 324 on the end 220 of the fiber optic adapter 200. This may occur before or after insertion of a connector into the cavity 326 (not shown). In the cavity 324, the connector 14 contacts the connector latch 344 at the engagement arms 370. Although not shown, initial contact of the shell 22 is at the ears 378. With the connector 14 in this position, the springs 340 are extended and the springs 348 are generally relaxed, and the sliding latch 342 is at its fully extended, unlatched position. Although not shown, the springs 340 may be initially compressed though that compression may be minimal. And, the springs 348 may be initially extended though the amount may be minimal. Thus, the springs 340 and 348 are in a generally relaxed state. The indicator flags 332 extend from the passageways 338 when the sliding latch 342 is in its fully extended position. In this position, the flags 332 provide a visual indication that the connector 14 is not properly installed.

Figure 24:
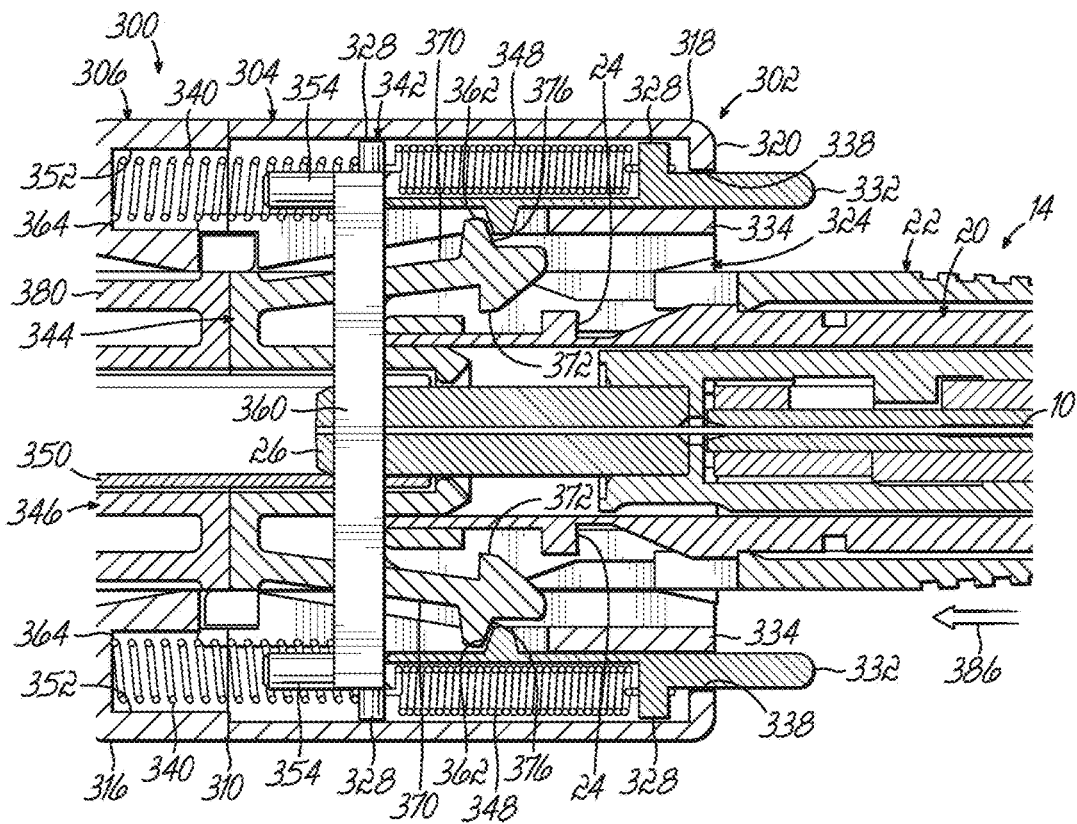

With reference to FIG. 24, when the installer pushes the connector 14 further into the cavity 324 (according to arrow 386), the engagement arms 370 of the connector latch 344 are deflected outwardly toward the sides 316, 318. In that regard, the forcible insertion of the connector 14 pushes the shell 22 against the ears 378 thereby pushing the tabs 372 apart. As the wedge-shaped tabs 372 are moved outwardly, the protrusions 376 of the engagement arms 370 are deflected into through-slot 368 and into an interference position with the stops 362. In the position shown in FIG. 24, the connector 14 may initially contact the frame 360 of the sliding latch 342 though the springs 340 may not be appreciably compressed by that contact. The springs 348 may not appreciably extend from their original relaxed state, and the indicator flags 332 remain extended to indicate that the connector 14 is not yet properly installed. The ferrule 26 of the connector 14 may extend slightly into a recess formed by the sleeve 350.

Figure 25:
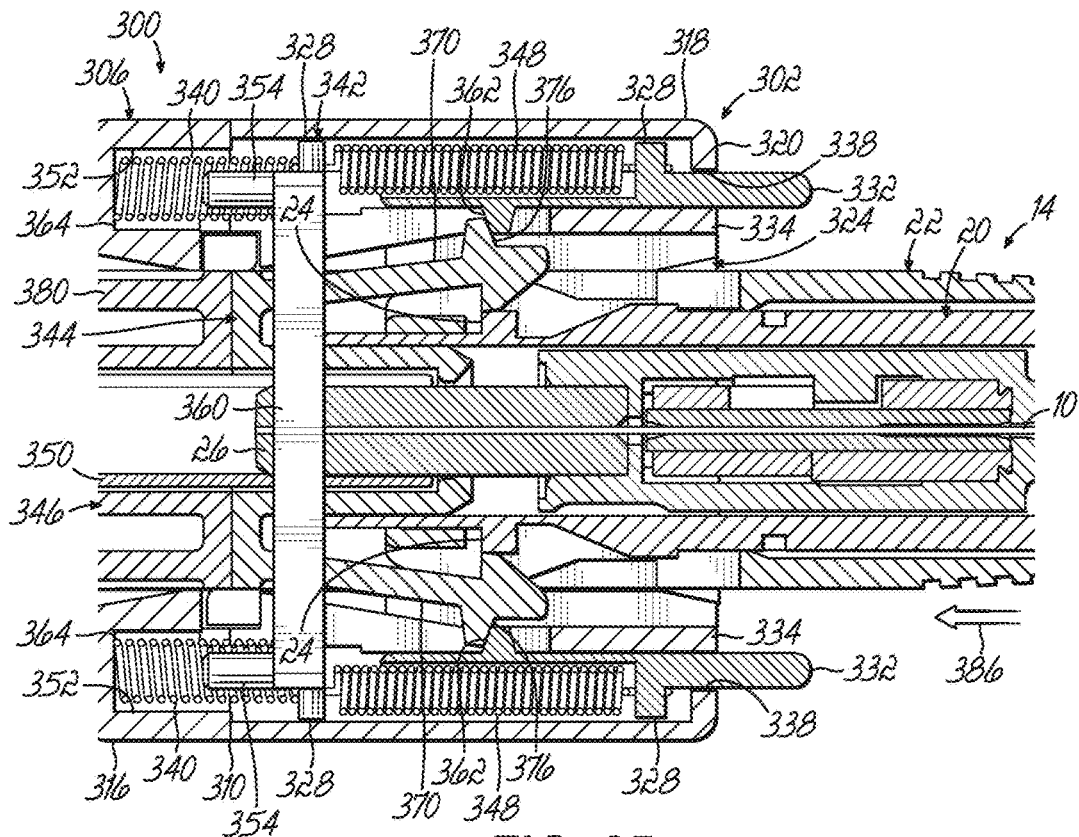
Figure 26:
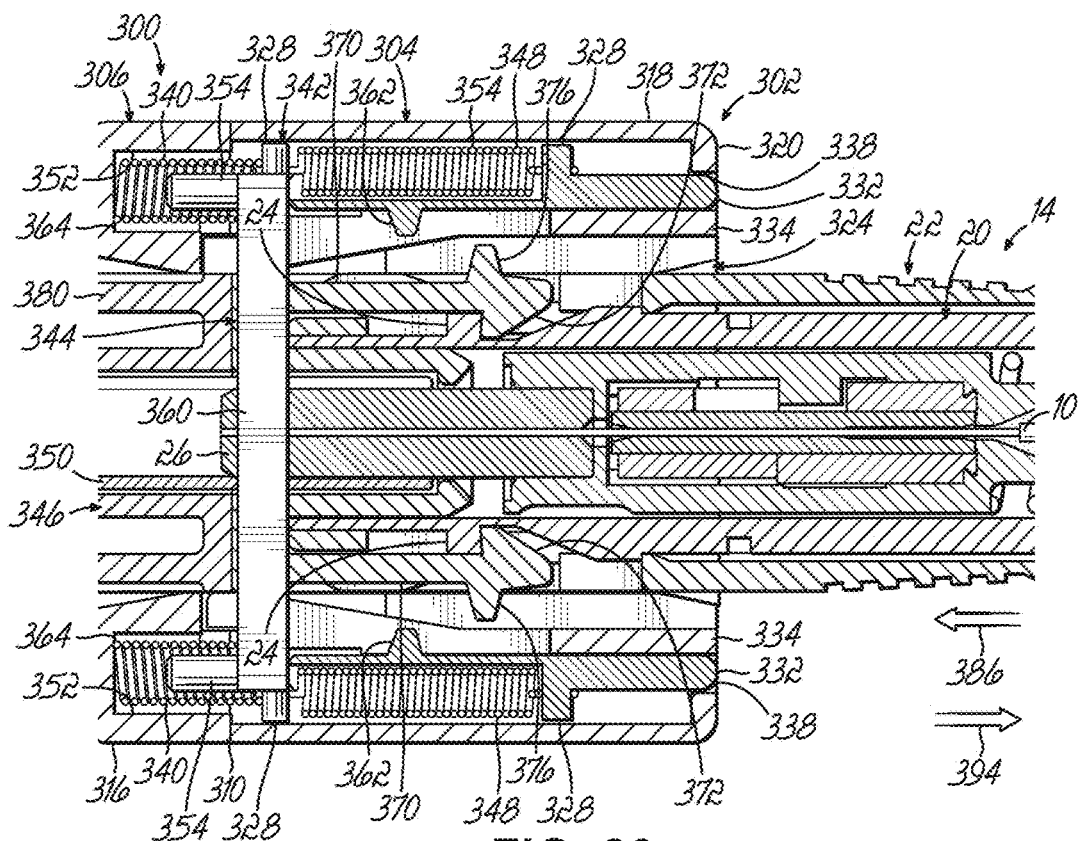
FIG. 26 is a schematic sectional view of the fiber optic adapter of FIG. 20 with a connector in an installed position.

With reference to FIG. 25, further forcible insertion of the connector 14 into the cavity 324 (along the direction of arrow 386) pushes on the sliding latch 342, compresses the springs 340, and extends the springs 348. The indicator flags 332 remain fully extended from the housing 302 though they may move slightly if there is a small gap between the protrusion 376 and stop 362. In particular, as the installer pushes the connector 14 further into the cavity 324, the plug frame 20 and/or shell 22 contact the frame 360 of the sliding latch 342. Movement of the sliding latch 342 according to arrow 386 compresses the springs 340 and extends the springs 348. Even though the springs 348 are extended, the indicator flags 332 remain substantially fully extended because the protrusions 376 are in contact with the stops 362. This prevents movement of the indicator flags 332 and permits extension of the springs 348. Thus, with the indicator flags 332 fully extended, the fiber optic adapter 300 visually indicates that the connector 14 is not fully inserted and is unlatched to the fiber optic adapter 300.

With further insertion of the connector 14 into the fiber optic adapter 300 from the position shown in FIG. 25 to the position shown in FIG. 26, a latched/locked position is reached. The indicator flags 332 are withdrawn into the housing 304 indicating that the connector 14 is properly installed in the fiber optic adapter 300. In this position, the connector 14 is locked to the fiber optic adapter 300. That is, the connector 14 and the adapter 300 resist their inadvertent separation. To that end, with further movement of the sliding latch 342 in the direction of arrow 386, the stops 24 of the plug frame 20 move past the wedge-shaped tabs 372. This permits the engagement arms 370 to spring back toward their undeflected positions (i.e., toward the connector 14). The wedge-shaped tabs 372 move to a position in which they form an interference fit to movement of the stop 24 on the plug frame 20 in a direction indicated by arrow 394. The stops 24 are then positioned between the wedge-shaped tabs 372 and the sleeve holder 346 and are effectively trapped in the fiber optic adapter 300. Thus, the connector 14 is latched to the fiber optic adapter 300 at this position. This configuration resists inadvertent, unintentional removal of the connector 14 from the fiber optic adapter 300.

In the exemplary embodiment, once the engagement arms 370 are released and move toward their original, undeflected positions, to lock the connector 14 to the fiber optic adapter 300, the corresponding protrusions 376 disengage from contact with the stops 362. The springs 348, which are extended, are then permitted to retract and pull the indicator flags 332 into the housing 302. This movement is sufficient to fully retract the indicator flags 332. Because the flags 332 are fully retracted, the technician knows that the connector 14 is properly installed and locked in the fiber optic adapter 300. Advantageously, the flags 332 are quickly withdrawn by contraction of the springs 348. Flags 332 have two positions during installation of a connector, an extended position when a connector is not fully installed and a retracted position when the connector is fully installed and latched within the adapter 300. The flags 332 do not have an intermediate position. With only two positions, the technician is able to easily verify that the connector 14 is or is not properly installed. In the latched position shown in FIG. 26, the springs 340 are compressed and the springs 348 are in a relaxed state.

Figure 27:
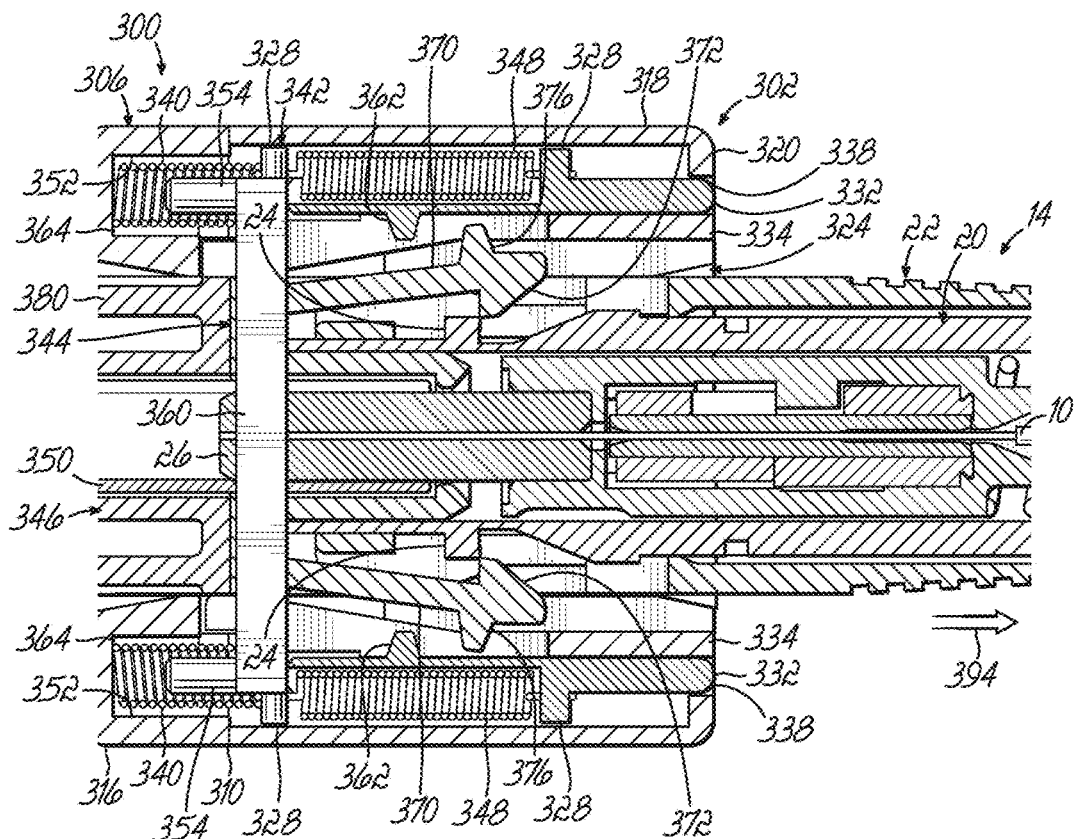
FIGS. 27-29 are schematic sectional views of the fiber optic adapter of FIG. 20 illustrating disassembly of a connector from the fiber optic adapter following installation.
Figure 28:
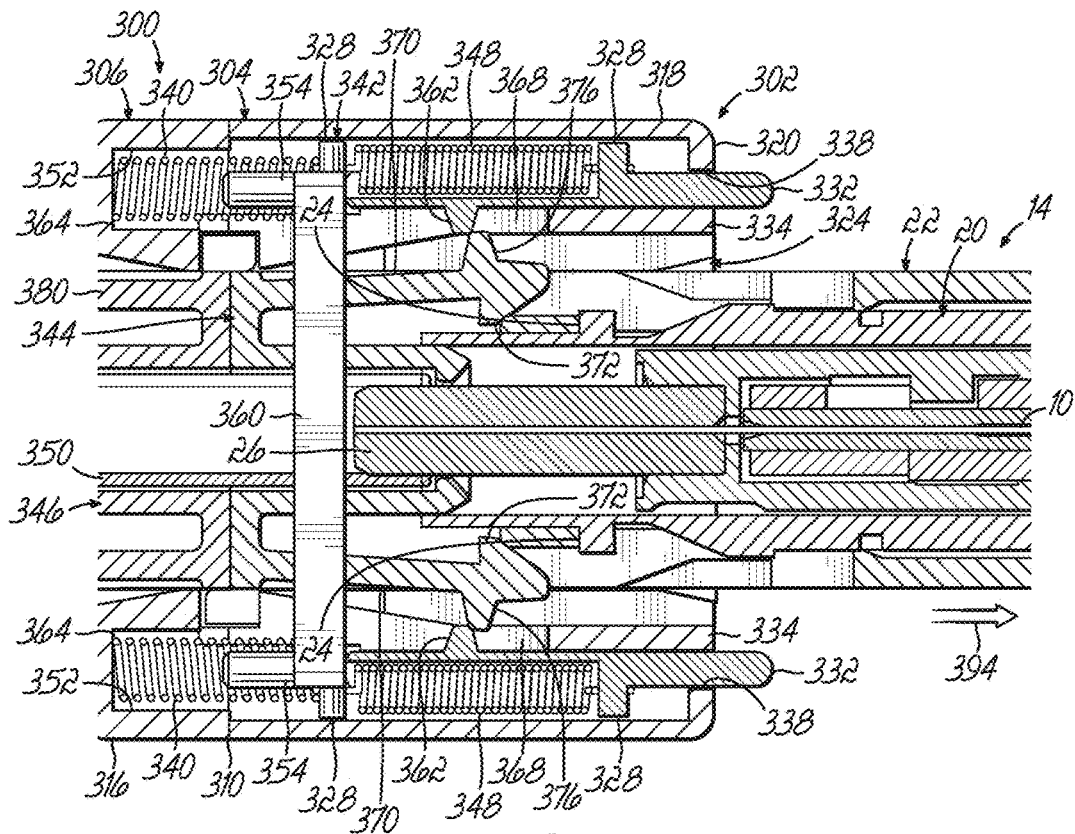
Figure 29:
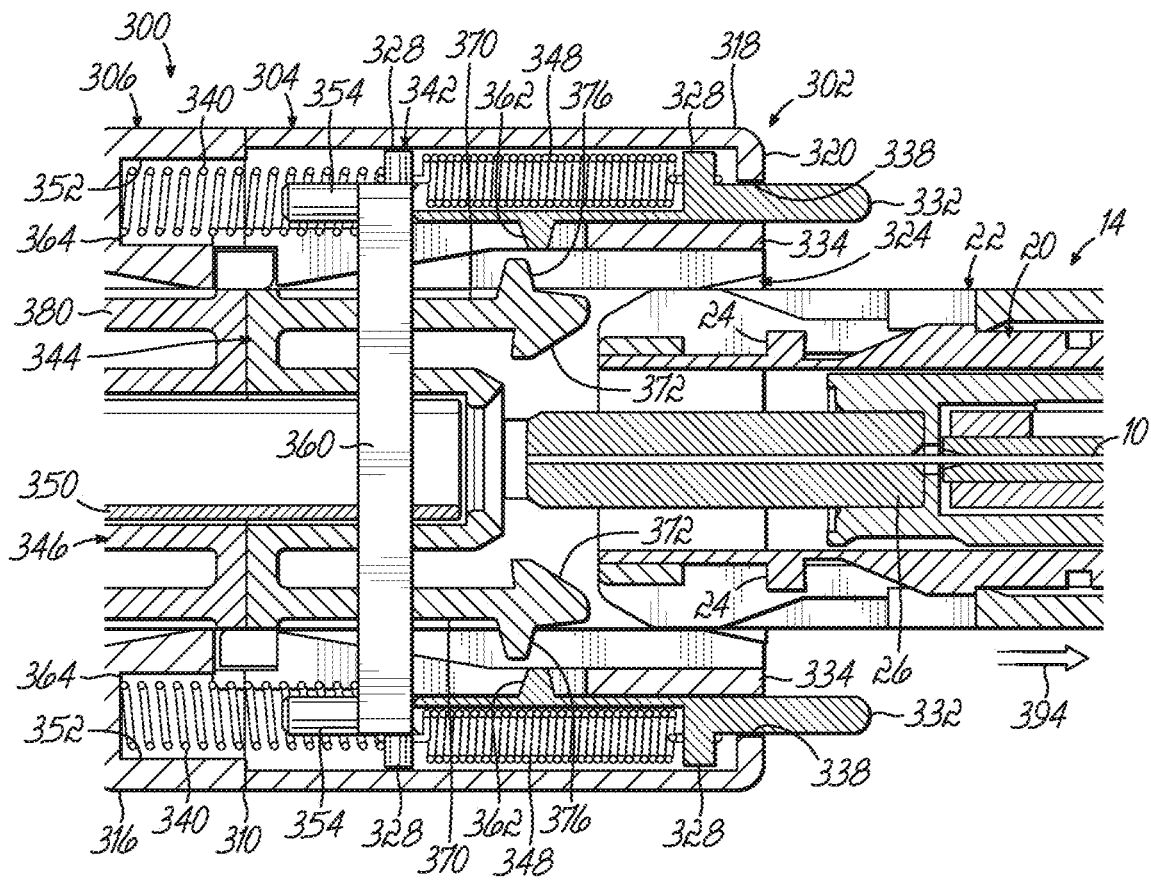

With reference to FIG. 27-29, while the fiber optic adapter 300 resists unintentional, inadvertent removal of the connector 14 when it is in the latched position (shown in FIG. 26), a technician can remove the connector 14 from the fiber optic adapter 300. Removal includes moving the wedge-shaped tabs 372 of the connector latch 344 from their interference position with the stops 24 on the plug frame 20 and withdrawing the connector 14 from the fiber optic adapter 300. To move the wedge-shaped tabs 372 out of the interference position with the stops 24, the technician slides the shell 22 relative to the plug frame 20 in the direction of arrow 394. The shell 22 engages the ears 378 pushing them outwardly relative to the stops 24. This also pushes the wedge-shaped tabs 376 outwardly relative to stops 24. As shown in FIG. 27 compared to FIG. 28, with relative sliding movement of the shell 22 relative to the plug frame 20 according to arrow 394, the wedge-shaped tabs 372 moves the protrusions 376 into an interference position with respect to stops 362 of the indicator flags 332. In FIG. 28, the indicator flags 332 may therefore partly extend from the passageways 338 when the stops 362 engage the protrusions 376.

With reference to FIG. 28, as the connector 14 is moved further outwardly, the sliding latch 342 moves with the connector 14, because the springs 340 begin extending from their compressed positions shown in FIG. 26 and push the sliding latch 342 outwardly. This may assist the removal of the connector 14 from the fiber optic adapter 300. The indicator flags 332 may move with the movement of the sliding latch 342 until stops 362 contact the protrusions 376. The flags 332 may therefore only partly extend from the housing 304 when the stops 362 contact protrusion 376.

As shown in FIG. 29, once the wedge-shaped tabs 372 clear the plug frame 20, they return to their undeflected position. The protrusions 376 disengage from the stops 362 and the indicator flags 332 may return to their fully extended positions and the sliding latch 242 is push to its extended position. The indicator flags 332 therefore indicate that the connector 14 is not properly installed.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments.

Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A fiber optic adapter for use with a fiber optic connector having a plug frame with a stop and a shell, the fiber optic adapter comprising:
   a housing that has a cavity at one end for receiving the fiber optic connector, the housing having at least one divider defining a passageway adjacent the cavity, the at least one divider having a through-slot between the passageway and the cavity;
   a sliding latch that is configured to contact the fiber optic connector when the fiber optic connector is inserted into the cavity, the sliding latch being movable within the housing from an extended position to a latched position;
   a connector latch that is configured to engage the stop when the sliding latch is at the latched position, the connector latch having an engagement arm from which a wedge-shaped tab extends to engage the stop and a protrusion extending from the engagement arm in a direction opposite the wedge-shaped tab, the protrusion being positioned to extend through the through-slot when the fiber optic connector is inserted into the cavity; and
   one or more springs that are operably coupled to the sliding latch, at least one spring of the one or more springs being compressible during insertion of the fiber optic connector into the cavity,
   wherein when the fiber optic connector is inserted into the cavity the fiber optic adapter indicates when the sliding latch is not at the latched position.

2. The fiber optic adapter of claim 1, wherein the at least one compressible spring is capable of producing a total force that is sufficient to move the fiber optic connector in a direction out of the cavity when the sliding latch is not at the latched position.

3. The fiber optic adapter of claim 1, wherein the at least one compressible spring is capable of moving the fiber optic connector in a direction out of the cavity when the sliding latch is moved by a distance less than a distance between the extended position and the latched position.

4. The fiber optic adapter of claim 1, wherein the sliding latch includes a housing engagement arm that is movable in the passageway.

5. The fiber optic adapter of claim 4, wherein the protrusion is configured to contact the housing engagement arm through the through-slot when the sliding latch moves toward the latched position.

6. The fiber optic adapter of claim 4, wherein the protrusion deflects the housing engagement arm away from the divider when the sliding latch moves toward the latched position.

7. The fiber optic adapter of claim 4, wherein the housing engagement arm includes a stop, and the divider defines a ledge that is engageable with the stop of the housing engagement arm at the latched position.

8. The fiber optic adapter of claim 4, wherein the sliding latch forms an interference fit with the housing at the latched position.

9. The fiber optic adapter of claim 4, wherein the passageway opens at the end of the housing adjacent the cavity, and the housing engagement arm is visible in the passageway when the sliding latch is at the extended position.

10. The fiber optic adapter of claim 1, wherein the at least one compressible spring is configured to be compressed when the sliding latch is at the latched position.

11. The fiber optic adapter of claim 1, wherein the one or more springs includes at least one spring that is coupled to the sliding latch and is extendable when the fiber optic connector is inserted into the cavity.

12. The fiber optic adapter of claim 11, wherein the at least one extendable spring is coupled to an indicator flag that projects from the housing when the sliding latch is not at the latched position.

13. The fiber optic adapter of claim 12, wherein the indicator flag has an extended position in which the indicator flag projects from the housing when the connector is not fully inserted in the adapter, and a retracted position in which the indicator flag is within the housing.

14. The fiber optic adapter of claim 13, wherein the indicator flag has only the extended position and the retracted position.

15. A fiber optic adapter for use with a fiber optic connector having a plug frame with a stop and a shell, the fiber optic adapter comprising:
   a housing that has a cavity at one end for receiving the fiber optic connector, the housing having a substantially rectangular shape defined by lateral sides between opposing ends;
   a sliding latch that is movable in the housing and is configured to contact the fiber optic connector when the fiber optic connector is inserted into the cavity, the sliding latch including a housing engagement arm and having an extended position and a latched position at which the fiber optic connector is coupled to the fiber optic adapter;
   a connector latch that is configured to engage the stop when the sliding latch is at the latched position, the connector latch having a protrusion that deflects the housing engagement arm outwardly towards one of the lateral sides of the housing when as the sliding latch is moved toward the latched position; and at least one spring that is operably coupled to the sliding latch, the at least one spring being compressible during insertion of the fiber optic connector into the cavity and being capable of moving the fiber optic connector in a direction out of the cavity when the sliding latch is moved by a distance less than a distance between the extended position and the latched position.

16. The fiber optic adapter of claim 15 wherein the housing engagement arm forms an interference fit with the housing at the latched position.

17. The fiber optic adapter of claim 15 wherein the housing includes a divider defining a passageway, and the housing engagement arm is movable in the passageway.

18. The fiber optic adapter of claim 17 wherein the divider includes a through-slot and the protrusion extends through the through-slot when the sliding latch is moved toward the latched position.

19. The fiber optic adapter of claim 17 wherein the divider includes a ledge in the passageway and the housing engagement arm contacts the ledge when the sliding latch is at the latched position.

20. The fiber optic adapter of claim 15 wherein the at least one spring is compressed when the sliding latch is in the latched position.

21. A fiber optic adapter for use with a fiber optic connector having a plug frame with a stop and a shell, the fiber optic adapter comprising:

a housing that has a cavity at one end for receiving the fiber optic connector;

a sliding latch that is configured to contact the fiber optic connector when the fiber optic connector is inserted into the cavity, the sliding latch being movable within the housing from an extended position to a latched position;

a connector latch that is configured to engage the stop when the sliding latch is at the latched position;

one or more springs that are operably coupled to the sliding latch, at least one spring of the one or more springs being compressible during insertion of the fiber optic connector into the cavity;

an indicator flag that is movable in the housing from an extended position to a retracted position; and wherein the at least one spring is coupled to the indicator flag, the at least one spring being extendable when the fiber optic connector is inserted into the cavity, wherein when the sliding latch reaches the latched position, the indicator flag is moved from the extended position to the retracted position.

22. The fiber optic adapter of claim 21, wherein the indicator flag has only the extended position and the retracted position.

* * * * *